(12) United States Patent
Saito

(10) Patent No.: US 8,057,866 B2
(45) Date of Patent: Nov. 15, 2011

(54) LIQUID CRYSTAL COMPOSITION AND LIQUID CRYSTAL DISPLAY DEVICE

(75) Inventor: Masayuki Saito, Chiba (JP)

(73) Assignees: JNC Corporation, Tokyo (JP); Chisso Petrochemical Corporation, Tokyo (JP)

( * ) Notice: Subject to any disclaimer, the term of this patent is extended or adjusted under 35 U.S.C. 154(b) by 0 days.

(21) Appl. No.: 12/702,115

(22) Filed: Feb. 8, 2010

(65) Prior Publication Data

US 2010/0243957 A1    Sep. 30, 2010

(30) Foreign Application Priority Data

Mar. 31, 2009  (JP) ................. 2009-084738

(51) Int. Cl.
- *C09K 19/34* (2006.01)
- *C09K 19/30* (2006.01)
- *C09K 19/12* (2006.01)
- *C09K 19/20* (2006.01)
- *C09K 19/14* (2006.01)
- *G02F 1/13* (2006.01)

(52) U.S. Cl. ............... 428/1.1; 252/299.61; 252/299.63; 252/299.66; 252/299.67

(58) Field of Classification Search ................ 428/1.1; 252/299.61, 299.63, 299.66, 299.67
See application file for complete search history.

(56) References Cited

U.S. PATENT DOCUMENTS

| 6,605,747 | B2 | 8/2003 | Kondo et al. | 568/642 |
| 6,827,876 | B2 * | 12/2004 | Kondo et al. | 252/299.6 |
| 6,864,397 | B2 * | 3/2005 | Kondo et al. | 568/647 |
| 2002/0120168 | A1 | 8/2002 | Kondo et al. | 568/39 |

FOREIGN PATENT DOCUMENTS

JP    2002-053513    2/2002

* cited by examiner

*Primary Examiner* — Shean Wu

(74) *Attorney, Agent, or Firm* — Hogan Lovells US LLP

(57) ABSTRACT

The invention provides a liquid crystal composition that satisfies at least one characteristic among the characteristics such as a high maximum temperature of a nematic phase, a low minimum temperature of a nematic phase, a small viscosity, a large optical anisotropy, a large dielectric anisotropy, a large specific resistance, a high stability to ultraviolet light, and a high stability to heat, or provides a liquid crystal composition that is properly balanced regarding at least two characteristics. The invention provides an AM device that has a short response time, a large voltage holding ratio, a large contrast ratio, a long service life and so forth. A liquid crystal display device contains the liquid crystal composition having a nematic phase that includes two components, wherein the first component is a specific compound having a large optical anisotropy and a large dielectric anisotropy and the second component is a specific compound having a small viscosity or a large maximum temperature. The liquid crystal display device contains the composition.

15 Claims, No Drawings

LIQUID CRYSTAL COMPOSITION AND LIQUID CRYSTAL DISPLAY DEVICE

BACKGROUND OF THE INVENTION

1. Field of the Invention

The invention relates mainly to a liquid crystal composition suitable for use in an active matrix (AM) device, and an AM device containing the composition. The invention relates particularly to a liquid crystal composition having a positive dielectric anisotropy, and to a device of a twisted nematic (TN) mode, an optically compensated bend (OCB) mode, an in-plane switching (IPS) mode or a polymer sustained alignment (PSA) mode containing the composition.

2. Related Art

In a liquid crystal display device, a classification based on the operation mode of liquid crystals includes phase change (PC), twisted nematic (TN), super twisted nematic (STN), electrically controlled birefringence (ECB), optically compensated bend (OCB), in-plane switching (IPS), vertical alignment (VA), polymer sustained alignment (PSA), and so forth. A classification based on a driving mode includes a passive matrix (PM) and an active matrix (AM). The PM is further classified into static, multiplex and so forth, and the AM is further classified into a thin film transistor (TFT), a metal-insulator-metal (MIM) and so forth. The TFT is further classified into amorphous silicon and polycrystal silicon. The latter is classified into a high-temperature type and a low-temperature type according to a production process. A classification based on a light source includes a reflection type utilizing natural light, a transmission type utilizing a backlight, and a semi-transmission type utilizing both the natural light and the backlight.

These devices contain a liquid crystal composition having suitable characteristics. The liquid crystal composition has a nematic phase. General characteristics of the composition should be improved to obtain an AM device having good general characteristics. Table 1 below summarizes a relationship between the general characteristics of the two. The general characteristics of the composition will be explained further based on a commercially available AM device. A temperature range of a nematic phase relates to a temperature range in which the device can be used. A desirable maximum temperature of the nematic phase is approximately 70° C. or more and a desirable minimum temperature is approximately −10° C. or less. The viscosity of the composition relates to the response time of the device. A short response time is desirable for displaying moving images with the device. Accordingly, a small viscosity of the composition is desirable. A small viscosity at a low temperature is more desirable.

The optical anisotropy of the composition relates to the contrast ratio of the device. The product ($\Delta n \times d$) of the optical anisotropy ($\Delta n$) of the composition and the cell gap (d) of the device is designed to maximize the contrast ratio. A suitable value of the product depends on the kind of operation modes. In a device having a TN mode or the like, a suitable value is approximately 0.45 µm. In this case, a composition having a large optical anisotropy is desirable for a device having a small cell gap. A large dielectric anisotropy of the composition contributes to a low threshold voltage, a small electric power consumption and a large contrast ratio. Accordingly, a large dielectric anisotropy is desirable. A large specific resistance of the composition contributes to a large voltage holding ratio and a large contrast ratio of the device. Accordingly, a composition having a large specific resistance is desirable at room temperature and also at a high temperature in the initial stage. A composition having a large specific resistance is desirable at room temperature and also at a high temperature after it has been used for a long time. The stability of the composition to ultraviolet light and heat relates to the service life of the liquid crystal display device. In the case where the stability is high, the device has a long service life. These characteristics are desirable for an AM device used in a liquid crystal projector, a liquid crystal television and so forth.

A composition having a positive dielectric anisotropy is used for an AM device having a TN mode. On the other hand, a composition having a negative dielectric anisotropy is used for an AM device having a VA mode. A composition having a positive or negative dielectric anisotropy is used for an AM device having an IPS mode. A composition having a positive or negative dielectric anisotropy is used for an AM device having a PSA mode. Examples of the liquid crystal composition having a positive dielectric anisotropy are disclosed in the following patent documents.

JP 2002-53513 A.

A desirable AM device is characterized as having a wide usable temperature range, short response time, a large contrast ratio, low threshold voltage, a large voltage holding ratio, a long service life, and so forth. Even one millisecond shorter response time is desirable. Thus, a composition having characteristics such as a high maximum temperature of a nematic phase, a low minimum temperature of a nematic phase, a small viscosity, a large optical anisotropy, a large dielectric anisotropy, a large specific resistance, a high stability to ultraviolet light, a high stability to heat, and so forth is especially desirable.

SUMMARY OF THE INVENTION

The invention concerns a liquid crystal composition having a nematic phase that includes two components, wherein the first component is at least one compound selected from the group of compounds represented by formulas (1), and the second component is at least one compound selected from the group of compounds represented by formula (2):

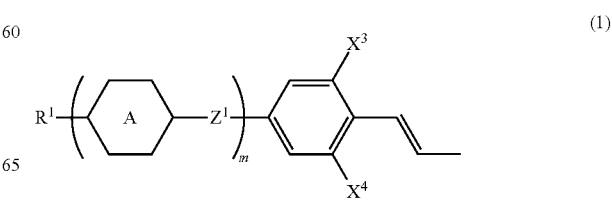

TABLE 1

General Characteristics of Liquid Crystal Composition and AM Device

| No. | General Characteristics of a Composition | General Characteristics of an AM Device |
|---|---|---|
| 1 | Temperature range of a nematic phase is wide | Usable temperature range is wide |
| 2 | Viscosity is small[1] | Response time is short |
| 3 | Optical anisotropy is suitable | Contrast ratio is large |
| 4 | Dielectric anisotropy is positively or negatively large | Threshold voltage is low and electric power consumption is small; Contrast ratio is large |
| 5 | Specific resistance is large | Voltage holding ratio is large and a contrast ratio is large |
| 6 | It is stable to ultraviolet light and heat | Service life is long |

[1] A liquid crystal composition can be injected into a cell in a short time.

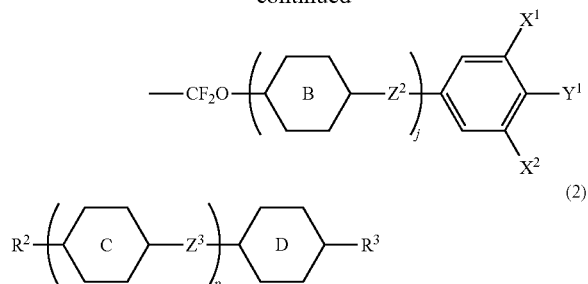

wherein $R^1$, $R^2$ and $R^3$ are independently alkyl having 1 to 12 carbons, alkoxy having 1 to 12 carbons or alkenyl having 2 to 12 carbons or alkenyl having 2 to 12 carbons in which arbitrary hydrogen is replaced by fluorine; ring A is independently tetrahydropyran-2,5-diyl, 1,4-cyclohexylene, 1,3-dioxane-2,5-diyl, 1,4-phenylene, 2-fluoro-1,4-phenylene, 3-fluoro-1,4-phenylene, 3,5-difluoro-1,4-phenylene or 2,5-pyrimidine; ring B is independently 1,4-cyclohexylene, 1,3-dioxane-2,5-diyl, 1,4-phenylene, 2-fluoro-1,4-phenylene, 3-fluoro-1,4-phenylene, 3,5-difluoro-1,4-phenylene or 2,5-pyrimidine; ring C and ring D are each independently 1,4-cyclohexylene, 1,4-phenylene, 2-fluoro-1,4-phenylene, 3-fluoro-1,4-phenylene, or 2,5-difluoro-1,4-phenylene; $Z^1$ and $Z^2$ are each independently a single bond, ethylene carbonyloxy or difluoromethyleneoxy; $Z^3$ is independently a single bond, ethylene or carbonyloxy; $X^1$, $X^2$, $X^3$ and $X^4$ are each independently hydrogen or fluorine; $Y^1$ is fluorine, chlorine or trifluoromethoxy; and p is 1, 2 or 3; m and j are each independently 0, 1, 2 or 3, and the sum of m and j is 3 or less.

The invention also concerns a liquid display device that includes the liquid crystal composition, and so forth.

DETAILED DESCRIPTION OF THE INVENTION

The terms used in the specification and claims are defined as follows. The liquid crystal composition, and/or the liquid crystal display device of the invention may occasionally be expressed simply as "the composition" or "the device," respectively. A liquid crystal display device is a generic term for a liquid crystal display panel and a liquid crystal display module. The "liquid crystal compound" is a generic term for a compound having a liquid crystal phase such as a nematic phase and a smectic phase, and also for a compound having no liquid crystal phase but being useful as a component of a composition. The useful compound contains a 6-membered ring such as 1,4-cyclohexylene and 1,4-phenylene, and its molecular structure is rod-like. An optically active compound or a polymerizable compound may occasionally be added to the composition. Even in the case where the compound is a liquid crystal compound, the compound is classified into an additive herein. At least one compound selected from the group of compounds represented by formula (1) may be abbreviated to "the compound (1)." "The compound (1)" means one compound or two or more compounds represented by formula (1). The other formulas are applied with the same rules. The term "arbitrary" indicates that both the position and the number are arbitrary, excluding the case where the number is 0.

A higher limit of a temperature range of a nematic phase may be abbreviated to "a maximum temperature." A lower limit of a temperature range of a nematic phase may be abbreviated to "a minimum temperature." "A specific resistance is large" means that the composition has a large specific resistance at room temperature and also at a high temperature close to the maximum temperature of the nematic phase in the initial stage, and that the composition has a large specific resistance at room temperature and also at a high temperature close to the maximum temperature of the nematic phase even after it has been used for a long time. "A voltage holding ratio is large" means that a device has a large voltage holding ratio at room temperature and also at a high temperature close to the maximum temperature of a nematic phase in the initial stage, and that the device has a large voltage holding ratio at room temperature and also at a high temperature close to the maximum temperature of the nematic phase even after it has been used for a long time. In the description of the characteristics such as the optical anisotropy, measured values obtained by the methods disclosed in Examples are used. The first component is one compound or two or more compounds. "A ratio of the first component" means the percentage by weight (% by weight) based on the total weight of a liquid crystal composition. A ratio of the second component and so forth are applied with the same rule. A ratio of an additive mixed with the composition means the percentage by weight (% by weight) or the percentage by weight (ppm) based on the total weight of a liquid crystal composition.

The symbol $R^1$ was used for a plurality of compounds in the chemical formulas for component compounds. In these compounds, two arbitrary $R^1$ may be identical or different. In one case, for example, $R^1$ of the compound (1) is ethyl and $R^1$ of the compound (3) is ethyl. In another case, $R^1$ of the compound (1) is ethyl and $R^1$ of the compound (3) is propyl. The same rule applies to $R^2$ and $X^1$. "CL" in the chemical formulas represents chlorine.

One of the advantages of the invention is to provide a liquid crystal composition that satisfies at least one characteristic among the characteristics such as a high maximum temperature of a nematic phase, a low minimum temperature of a nematic phase, a small viscosity, a large optical anisotropy, a large dielectric anisotropy, a large specific resistance, a high stability to ultraviolet light, and a high stability to heat. Another of the advantages of the invention is to provide a liquid crystal composition that is properly balanced regarding at least two characteristics. Another of the advantages of the invention is to provide a liquid crystal display device that contains the composition. Another of the advantages of the invention is to provide a composition that has a large optical anisotropy, a large dielectric anisotropy, a high stability to ultraviolet light and so forth, and to provide an AM device that has a short response time, a large voltage holding ratio, a large contrast ratio, a long service life and so forth.

The invention has the following features:

Item 1. A liquid crystal composition having a nematic phase that includes two components, wherein the first component is at least one compound selected from the group of compounds represented by formulas (1), and the second component is at least one compound selected from the group of compounds represented by formula (2):

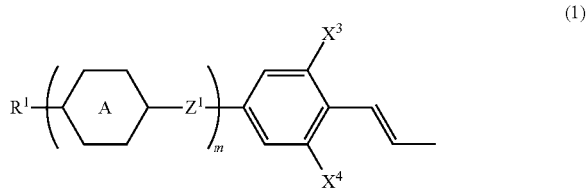

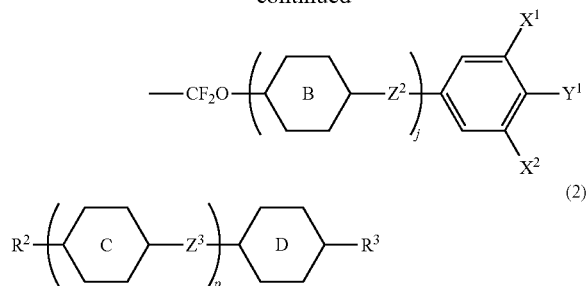

wherein $R^1$, $R^2$ and $R^3$ are independently alkyl having 1 to 12 carbons, alkoxy having 1 to 12 carbons or alkenyl having 2 to 12 carbons or alkenyl having 2 to 12 carbons in which arbitrary hydrogen is replaced by fluorine; ring A is independently tetrahydropyran-2,5-diyl, 1,4-cyclohexylene, 1,3-dioxane-2,3-diyl, 1,4-phenylene, 2-fluoro-1,4-phenylene, 3-fluoro-1,4-phenylene, 3,5-difluoro-1,4-phenylene or 2,5-pyrimidine; ring B is independently 1,4-cyclohexylene, 1,3-dioxane-2,5-diyl, 1,4-phenylene, 2-fluoro-1,4-phenylene, 3-fluoro-1,4-phenylene, 3,5-difluoro-1,4-phenylene or 2,5-pyrimidine; ring C and ring D are each independently 1,4-cyclohexylene, 1,4-phenylene, 2-fluoro-1,4-phenylene, 3-fluoro-1,4-phenylene, or 2,5-difluoro-1,4-phenylene; $Z^1$ and $Z^2$ are each independently a single bond, ethylene, carbonyloxy or difluoromethyleneoxy; $Z^3$ is independently a single bond, ethylene or carbonyloxy; $X^1$, $X^2$, $X^3$ and $X^4$ are each independently hydrogen or fluorine; $Y^1$ is fluorine, chlorine or trifluoromethoxy; and p is 1, 2 or 3; m and j are each independently 0, 1, 2 or 3, and the sum of m and j is 3 or less.

Item 2. The liquid crystal composition according to item 1, wherein the first component is at least one compound selected from the group of compounds represented by formulas (1-1) to (1-11).

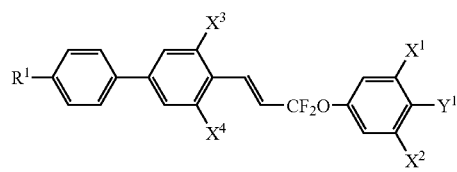

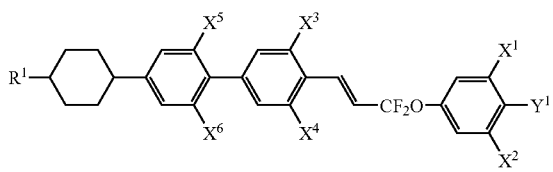

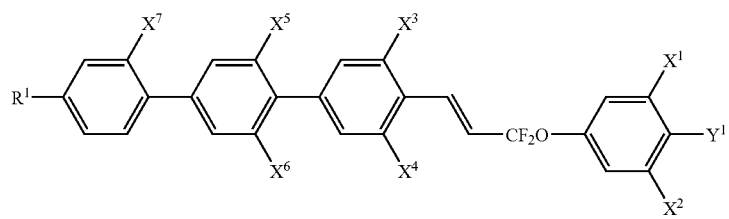

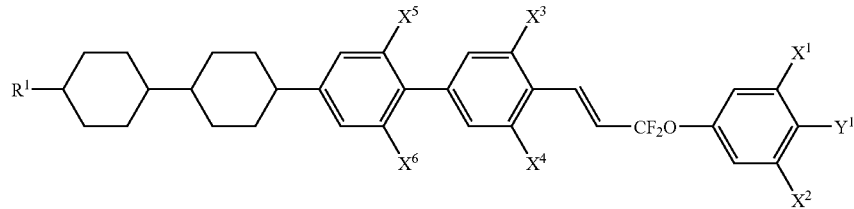

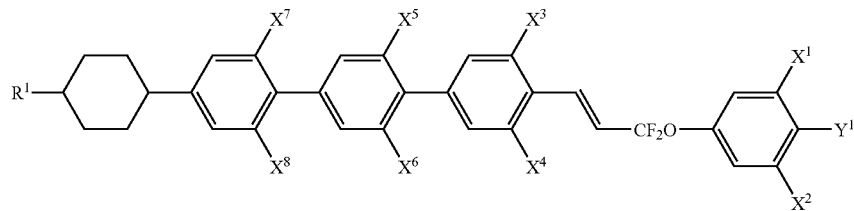

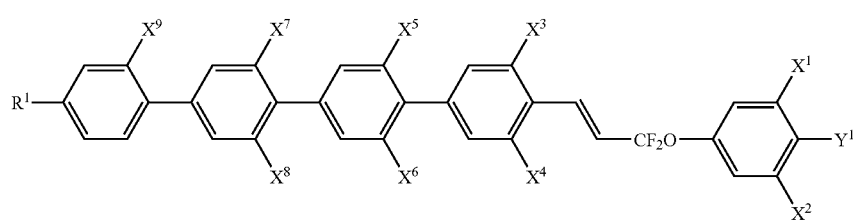

-continued

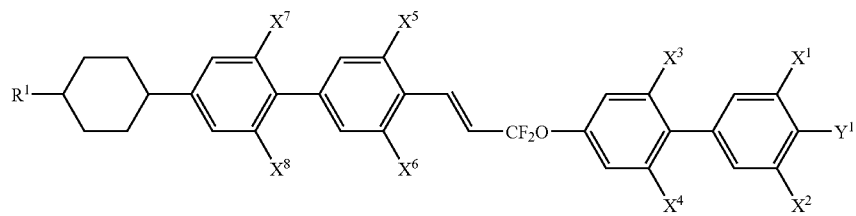
(1-7)

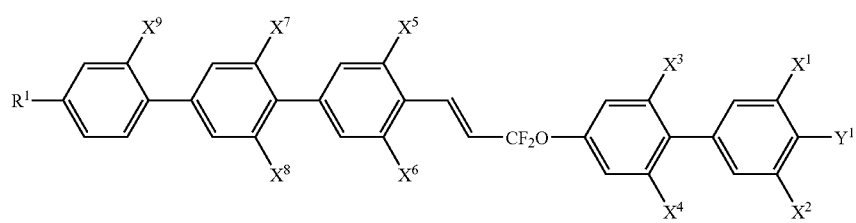
(1-8)

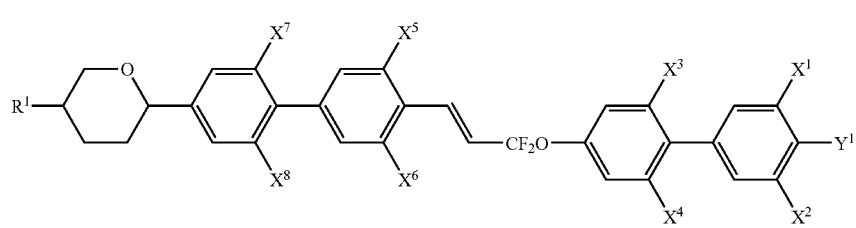
(1-9)

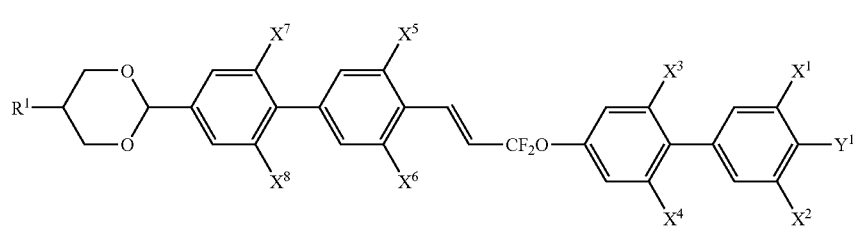
(1-10)

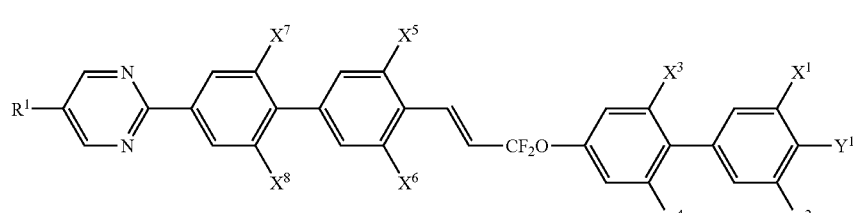
(1-11)

wherein $R^1$ is alkyl having 1 to 12 carbons, alkoxy having 1 to 12 carbons or alkenyl having 2 to 12 carbons or alkenyl having 2 to 12 carbons in which arbitrary hydrogen is replaced by fluorine; $X^1, X^2, X^3, X^4, X^5, X^6, X^7, X^8$ and $X^9$ are each independently hydrogen or fluorine; and $Y^1$ is fluorine, chlorine or trifluoromethoxy.

Item 3. The liquid crystal composition according to item 2, wherein the first component is at least one compound selected from the group of compounds represented by formulas (1-3).

Item 4. The liquid crystal composition according to item 2, wherein the first component is at least one compound selected from the group of compounds represented by formulas (1-6).

Item 5. The liquid crystal composition according to item 2, wherein the first component is at least one compound selected from the group of compounds represented by formulas (1-8).

Item 6. The liquid crystal composition according to any one of items 1 to 5, wherein the second component is at least one compound selected from the group of compounds represented by formulas (2-1) to (2-11).

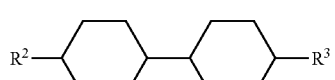
(2-1)

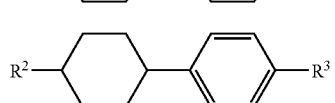
(2-2)

(2-3)

(2-4)

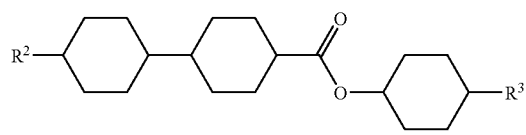

-continued

(2-5)

(2-6)

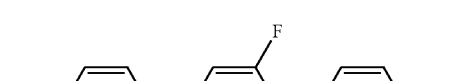
(2-7)

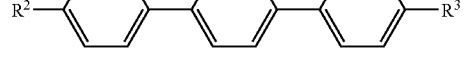
(2-8)

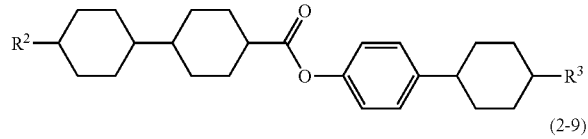
(2-9)

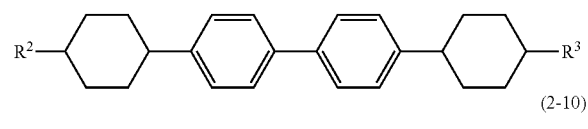
(2-10)

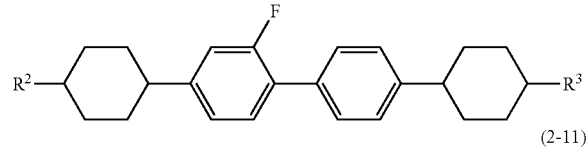
(2-11)

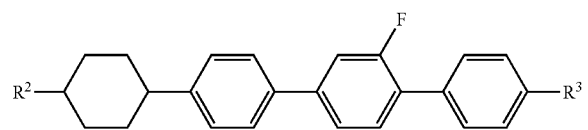

wherein $R^2$ and $R^3$ are each independently alkyl having 1 to 12 carbons, alkoxy having 1 to 12 carbons, alkenyl having 2 to 12 carbons, or alkenyl having 2 to 12 carbons in which arbitrary hydrogen is replaced by fluorine.

Item 7. The liquid crystal composition according to item 6, wherein the second component is at least one compound selected from the group of compounds represented by formula (2-1).

Item 8. The liquid crystal composition according to item 6, wherein the second component is a mixture of at least one compound selected from the group of compounds represented by formula (2-1) and at least one compound selected from the group of compounds represented by formula (2-5).

Item 9. The liquid crystal composition according to item 6, wherein the second component is a mixture of at least one compound selected from the group of compounds represented by formula (2-1) and at least one compound selected from the group of compounds represented by formula (2-7)

Item 10. The liquid crystal composition according to item 6, wherein the second component is a mixture of at least one compound selected from the group of compounds represented by formula (2-1), at least one compound selected from the group of compounds represented by formula (2-5), and at least one compound selected from the group of compounds represented by formula (2-7).

Item 11. The liquid crystal composition according to any one of items 1 to 10, wherein the ratio of the first component is in the range of approximately 5% to approximately 40% by weight, and the ratio of the second component is in the range of approximately 35% to approximately 95% by weight, based on the total weight of the liquid crystal composition.

Item 12. The liquid crystal composition according to any one of items 1 to 11, wherein the composition further includes at least one compound selected from the group of compounds represented by formula (3) as the third component.

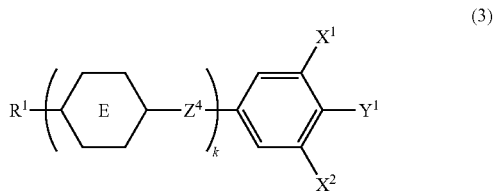
(3)

wherein $R^1$ is alkyl having 1 to 12 carbons, alkoxy having 1 to 12 carbons or alkenyl having 2 to 12 carbons; or alkenyl having 2 to 12 carbons in which arbitrary hydrogen is replaced by fluorine.

ring E is independently 1,4-cyclohexylene, 1,3-dioxane-2,5-diyl, 1,4-phenylene, 2-fluoro-1,4-phenylene, 3-fluoro-1,4-phenylene, 3,5-difluoro-1,4-phenylene, or 2,5-pyrimidine; $Z^4$ is independently a single bond, ethylene, carbonyloxy, or difluoromethyleneoxy; $X^1$ and $X^2$ are each independently hydrogen or fluorine; $Y^1$ is fluorine, chlorine, or trifluoromethoxy; and k is 1, 2 or 3.

Item 13. The liquid crystal composition according to item 12, wherein the third component is at least one compound selected from the group of compounds represented by formulas (3-1) to (3-24).

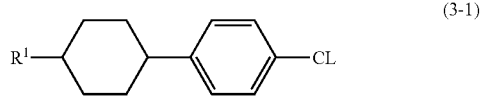
(3-1)

(3-2)

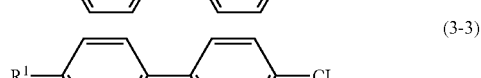
(3-3)

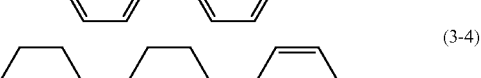
(3-4)

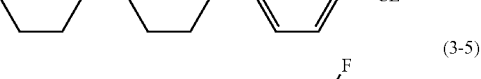
(3-5)

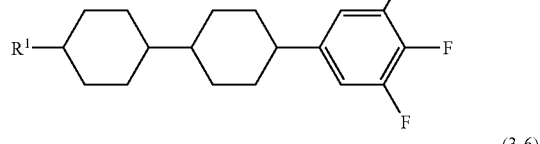
(3-6)

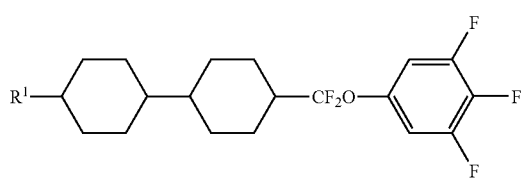

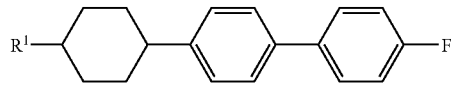
(3-7)
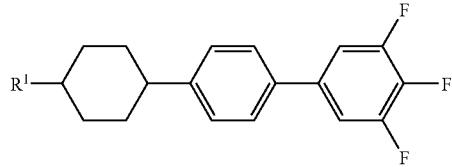
(3-8)
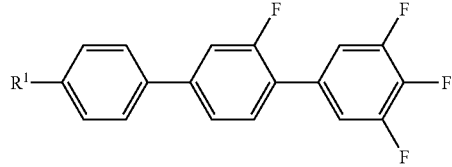
(3-9)
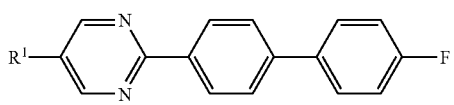
(3-10)
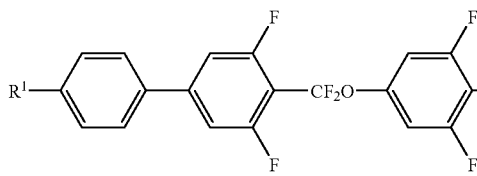
(3-11)
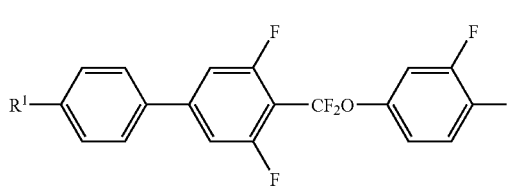
(3-12)
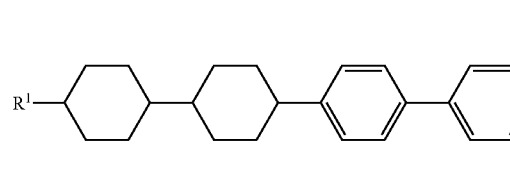
(3-13)
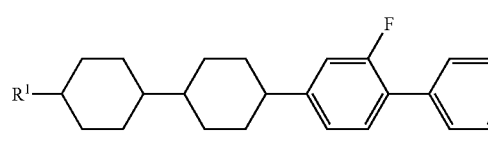
(3-14)
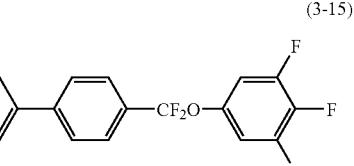
(3-15)
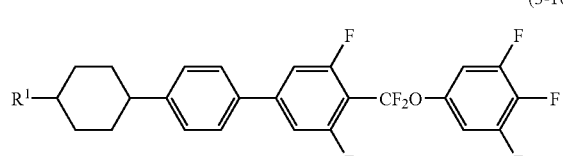
(3-16)
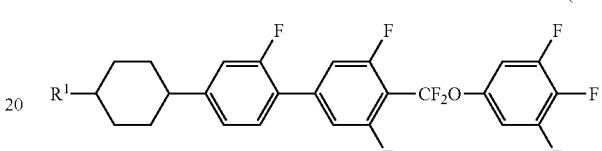
(3-17)
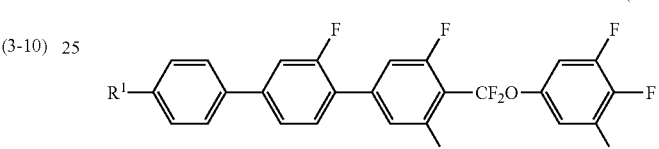
(3-18)
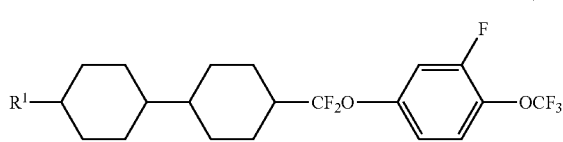
(3-19)
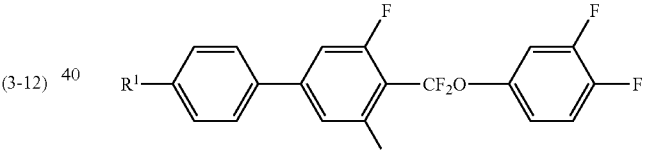
(3-20)
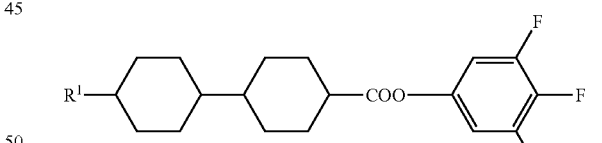
(3-21)
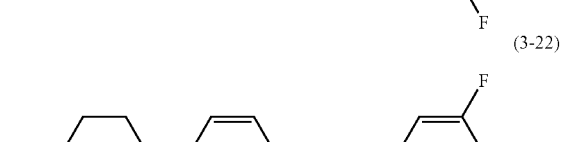
(3-22)
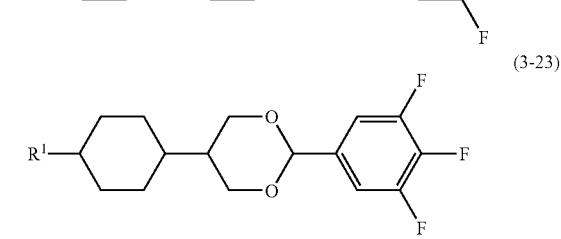
(3-23)

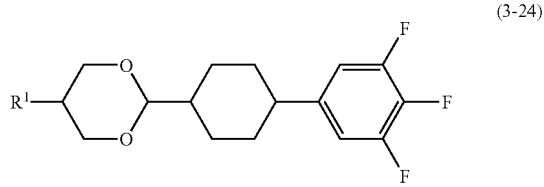

(3-24)

wherein $R^1$ is alkyl having 1 to 12 carbons, alkoxy having 1 to 12 carbons or alkenyl having 2 to 12 carbons, or alkenyl having 2 to 12 carbons in which arbitrary hydrogen is replaced by fluorine.

Item 14. The liquid crystal composition according to item 13, wherein the third component is at least one compound selected from the group of compounds represented by formula (3-9).

Item 15. The liquid crystal composition according to item 13, wherein the third component is at least one compound selected from the group of compounds represented by formula (3-11).

Item 16. The liquid crystal composition according to item 13, wherein the third component is at least one compound selected from the group of compounds represented by formula (3-15).

Item 17. The liquid crystal composition according to item 13, wherein the third component is at least one compound selected from the group of compounds represented by formula (3-18).

Item 18. The liquid crystal composition according to item 13, wherein the third component is a mixture of at least one compound selected from the group of compounds represented by formula (3-6) and at least one compound selected from the group of compounds represented by formula (3-11).

Item 19. The liquid crystal composition according to item 13, wherein the third component is a mixture of at least one compound selected from the group of compounds represented by formula (3-9) and at least one compound selected from the group of compounds represented by formula (3-18).

Item 20. The liquid crystal composition according to item 13, wherein the third component is a mixture of at least one compound selected from the group of compounds represented by formula (3-15) and at least one compound selected from the group of compounds represented by formula (3-18).

Item 21. The liquid crystal composition according to any one of items 12 to 20, wherein the ratio of the third component is in the range of approximately 3% to approximately 35% by weight based on the total weight of the liquid crystal composition.

Item 22. The liquid crystal composition according to any one of items 1 to 21, wherein the composition has a maximum temperature of a nematic phase of approximately 70° C., or more, an optical anisotropy (25° C.) at a wavelength of 589 nm of approximately 0.08 or more, and a dielectric anisotropy (25° C.) at a frequency of 1 kHz of approximately 2 or more.

Item 23. The liquid crystal display device according to any one of items 1 to 22 that includes the liquid crystal composition.

Item 24. The liquid crystal display device according to item 23, wherein the operation mode of the liquid crystal display device is a twisted nematic (TN) mode, an optically compensated bend (OCB) mode, an in-plane switching (IPS) mode, or a polymer sustained alignment (PSA) mode, and the driving mode of the liquid crystal display device is an active matrix mode.

The invention further includes: (1) the composition described above, wherein the composition further contains an optically active compound; (2) the composition described above, wherein the composition further contains an additive, such as an antioxidant, an ultraviolet light absorbent, a defoaming agent, a polymerizable compound, and/or a polymerization initiator; (3) an AM device containing the composition described above; (4) a device having a TN, ECB, OCB, IPS, or PSA, containing the composition described above; (5) a device of a transmission type, containing the composition described above; (6) use of the composition described above as a composition having a nematic phase; and (7) use as an optically active composition by adding an optically active compound to the composition described above.

The composition of the invention will be explained in the following order. First, the constitution of component compounds in the composition will be explained. Second, the main characteristics of the component compounds and the main effects of the compounds on the composition will be explained. Third, the combinations of the components in the composition, a desirable ratio of the component compounds, and the basis thereof will be explained. Fourth, a desirable embodiment of the component compounds will be explained. Fifth, examples of the component compounds will be shown. Sixth, additives that may be added to the composition will be explained. Seventh, the methods for preparing the component compounds will be explained. Lastly, use of the composition will be explained.

First, the constitution of component compounds in the composition will be explained. The composition of the invention is classified into a composition A and a composition B. The composition A may further contain other liquid crystal compounds, an additive, an impurity, and so forth. "The other liquid crystal compounds" are different from the compound (1), the compound (2) and the compound (3). Such compounds are mixed with the composition for the purpose of adjusting the characteristics of the composition. The other liquid crystal compounds desirably contain a smaller amount of a cyano compound from the viewpoint of stability to heat or ultraviolet light. A more desirable ratio of the cyano compound is approximately 0% by weight. The additive includes an optically active compound, an antioxidant, an ultraviolet light absorbent, a coloring matter, a defoaming agent, a polymerizable compound, a polymerization initiator and so forth. The impurity is a compound and so forth contaminated in a process such as the synthesis of a component compound and so forth. Even in the case where the compound is a liquid crystal compound, it is classified into an impurity.

The composition B is essentially consisting of compounds selected from the compound (1), the compound (2), and the compound (3). The term "essentially" means that the composition does not contain a liquid crystal compound different from these compounds. The composition B has fewer components as compared to the composition A. The composition B is more desirable than the composition A from the viewpoint of cost reduction. The composition A is more desirable than the composition B from the viewpoint that physical properties can be adjusted further by adding the other liquid crystal compounds.

Second, the main characteristics of the component compounds and the main effects of the compounds on the composition will be explained. The main characteristics of the component compounds are summarized in Table 2. In Table 2, the symbol L represents large or high, the symbol M represents a middle degree, and the symbol S represents small or low. The symbols L, M and S are classifications based on qualitative comparison among the component compounds and 0 (zero) means the value of dielectric anisotropy is nearly zero.

TABLE 2

Characteristics of Compounds

| | Compound | | |
|---|---|---|---|
| | (1) | (2) | (3) |
| Maximum Temperature | M-L | S-L | S-M |
| Viscosity | L | S-M | M-L |
| Optical Anisotropy | L | S-L | M-L |
| Dielectric Anisotropy | M-L | 0 | S-L |
| Specific Resistance | L | L | L |

The main effects of the component compounds on the characteristics of the composition upon mixing the component compounds with the composition are as follows. The compound (1) increases the optical anisotropy and the dielectric anisotropy. The compound (2) increases the maximum temperature or decreases the viscosity. The compound (3) decreases the minimum temperature and increases the dielectric anisotropy.

Third, the combinations of the components in the composition, desirable ratios of the component compounds, and the basis thereof will be explained. The combinations of the components in the composition are first component+second component, and first component+second component+third component. The combinations of the components in the composition are desirably first component+second component+third component.

A desirable ratio of the component compounds and the basis thereof will be explained. A desirable ratio of the first component is approximately 5% by weight or more for increasing the maximum temperature and increasing the dielectric anisotropy, and is approximately 40% by weight or less for decreasing the minimum temperature. A more desirable ratio is in the range from approximately 5% to approximately 35% by weight. A particularly desirable ratio is in the range from approximately 5% to approximately 30% by weight.

A desirable ratio of the second component is approximately 35% by weight or more for increasing the maximum temperature or decreasing the viscosity, and is approximately 95% by weight or less for increasing the dielectric anisotropy. A more desirable ratio is in the range from approximately 40% to approximately 90% by weight. A particularly desirable ratio is in the range from approximately 45% to approximately 85% by weight.

The third component is suitable for preparing a composition having a particularly large dielectric anisotropy. A desirable ratio of the component is in the range from approximately 3% to approximately 35% by weight. A more desirable ratio is in the range from approximately 5% to approximately 30% by weight. A particularly desirable ratio is in the range from approximately 5% to approximately 25% by weight.

Fourth, a desirable embodiment of the component compounds will be explained. $R^1$, $R^2$ and $R^3$ are each independently alkyl having 1 to 12 carbons, alkoxy having 1 to 12 carbons, alkenyl having 2 to 12 carbons, or alkenyl having 2 to 12 carbons in which arbitrary hydrogen is replaced by fluorine. Desirable $R^1$ is alkyl having 1 to 12 carbons for increasing the stability to ultraviolet light or heat. Desirable $R^2$ is alkenyl having 2 to 12 carbons for decreasing the minimum temperature or decreasing the viscosity. Desirable $R^3$ is alkyl having 1 to 12 carbons for increasing the stability to ultraviolet light or heat.

Desirable alkyl is methyl, ethyl, propyl, butyl, pentyl, hexyl, heptyl, or octyl. More desirable alkyl is ethyl, propyl, butyl, pentyl, or heptyl for decreasing the viscosity.

Desirable alkoxy is methoxy, ethoxy, propoxy, butoxy, pentyloxy, hexyloxy, or heptyloxy. More desirable alkoxy is methoxy or ethoxy for decreasing the viscosity.

Desirable alkenyl is vinyl, 1-propenyl, 2-propenyl, 1-butenyl, 2-butenyl, 3-butenyl, 1-pentenyl, 2-pentenyl, 3-pentenyl, 4-pentenyl, 1-hexenyl, 2-hexenyl, 3-hexenyl, 4-hexenyl, or 5-hexenyl. More desirable alkenyl is vinyl, 1-propenyl, 3-butenyl, or 3-pentenyl for decreasing the viscosity. A desirable configuration of —CH═CH— in these alkenyls depends on the position of a double bond. Trans is desirable in the alkenyl such as 1-propenyl, 1-butenyl, 1-pentenyl, 1-hexenyl, 3-pentenyl, and 3-hexenyl for decreasing the viscosity. Cis is desirable in the alkenyl such as 2-butenyl, 2-pentenyl and 2-hexenyl. In these alkenyls, linear alkenyl is preferable to branched alkenyl.

Desirable examples of alkenyl in which arbitrary hydrogen is replaced by fluorine are 2,2-difluorovinyl, 3,3-difluoro-2-propenyl, 4,4-difluoro-3-butenyl, 5,5-difluoro-4-pentenyl, and 6,6-difluoro-5-hexenyl. More desirable examples are 2,2-difluorovinyl and 4,4-difluoro-3-butenyl for decreasing the viscosity.

Ring A is independently tetrahydropyran-2,5-diyl, 1,4-cyclohexylene, 1,3-dioxane-2,5-diyl, 1,4-phenylene, 2-fluoro-1,4-phenylene, 3-fluoro-1,4-phenylene, 3,5-difluoro-1,4-phenylene or 2,5-pyrimidine; when m is two or three desirable two rings A may be the same or different. Desirable ring A is 1,4-phenylene for increasing the optical anisotropy. tetrahydropyran-2,5-diyl is

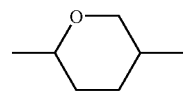

or

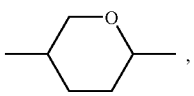, desirably is

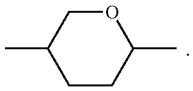.

ring B and ring E are each independently 1,4-cyclohexylene, 1,3-dioxane-2,5-diyl, 1,4-phenylene, 2-fluoro-1,4-phenylene, 3-fluoro-1,4-phenylene, 3,5-difluoro-1,4-phenylene, or 2,5-pyrimidine. When j is 2 or 3 in the compound (3), arbitrary two rings B may be the same or different. When k is 2 or 3, arbitrary two rings E may be the same or different. Desirable ring B and ring E are each independently 1,4-phenylene for increasing the optical anisotropy. Ring C and ring D are each independently 1,4-cyclohexylene, 1,4-phenylene, 2-fluoro-1,4-phenylene, 3-fluoro-1,4-phenylene, or 2,5-difluoro-1,4-phenylene. When p is 2 or 3, arbitrary two rings C may be the same or different. Desirable ring C and ring D are each independently 1,4-cyclohexylene for decreasing the viscosity or 1,4-phenylene for increasing the optical anisotropy.

$Z^1$, $Z^2$ and $Z^4$ are each independently a single bond, ethylene, or carbonyloxy or difluoromethyleneoxy. When m is 2 or 3, arbitrary two $Z^1$ may be the same or different. When j is 2 or 3, arbitrary two $Z^2$ may be the same or different. When k is 2 or 3, arbitrary two $Z^4$ may be the same or different. Desirable $Z^1$ and $Z^2$ are a each independently a single bond for decreasing the viscosity. Desirable $Z^4$ is difluoromethyleneoxy for increasing the dielectric anisotropy. $Z^3$ is independently a single bond, ethylene, or carbonyloxy; when p is 2 or 3 arbitrary two $Z^3$ may be the same or different. Desirable $Z^3$ is a single bond for decreasing the viscosity.

$X^1$, $X^2$, $X^3$, $X^4$, $X^5$, $X^6$, $X^7$, $X^8$ and $X^9$ are each independently hydrogen or fluorine. Two or more of $X^1$, $X^2$, $X^3$, $X^4$, $X^5$, $X^6$, $X^7$, $X^8$ and $X^9$ are desirably fluorine for increasing the dielectric anisotropy.

$Y^1$ is fluorine, chlorine or trifluoromethoxy. Desirable $Y^1$ is fluorine for decreasing the minimum temperature.

The numerical value m is 0 or 1. Desirable m is 0 for decreasing the viscosity.

The numerical value m and j are each individually 0, 1, 2 or 3, and the sum of m and j is three or less. Desirable m is 2 for increasing the maximum temperature. Desirable j is 0 for decreasing the minimum temperature. P and k are each independently 1, 2 or 3. Desirable p is 0 for decreasing the viscosity. Desirable k is 2 for decreasing the minimum temperature.

Fifth, examples of the component compounds will be shown. In the desirable compounds described below, $R^4$ is linear alkyl having 1 to 12 carbons. $R^5$ is linear alkyl having 1 to 12 carbons or linear alkoxy having 1 to 12 carbons. $R^6$ and $R^7$ are each independently linear alkyl having 1 to 12 carbons or linear alkenyl having 2 to 12 carbons. On the configuration of 1,4-cyclohexylene, trans is preferable to cis for increasing the maximum temperature.

Desirable compound (1) are the compound (1-1-1) to (1-1-3), the compounds (1-2-1) to (1-2-3), the compound (1-3-1) to (1-3-3), and the compound (1-4-1) to (1-4-2), the compound (1-5-1) to (1-5-3), the compound (1-6-1) to (1-6-2), the compound (1-7-1), the compound (1-8-1) to (1-8-2), the compound (1-9-1) to (1-11-1). More desirable compound (1) are the compound (1-1-3), the compound (1-2-1), the compound (1-2-3), the compound (1-3-3) the compound (1-4-2), the compound (1-5-3), the compound (1-6-2) the compound (1-7-1), and the compound (1-8-2). Especially desirable compound (1) are the compound (1-1-3), the compound (1-2-3), the compound (1-3-3), the compound (1-5-3), the compound (1-6-2), and the compound (1-8-2). Desirable compound (2) are the compound (2-1-1) to (2-11-1). More desirable (2) are the compound (2-1-1), the compound (2-3-1), the compound (2-5-1), the compound (2-7-1), the compound (2-8-1), and the compound (2-11-1). Especially desirable compound (2) are the compound (2-1-1), compound (2-5-1), the compound (2-7-1), and the compound (2-11-1). Desirable compound (3) are the compounds (3-1-1) to (3-24-1). More desirable compound (3) are the compound (3-6-1), the compound (3-9-1), the compound (3-11-1), the compound (3-15-1) and the compound (3-18-1). Especially desirable compound (3) are the compounds (3-9-1), the compound (3-11-1), the compound (3-15-1) and the compound (3-18-1).

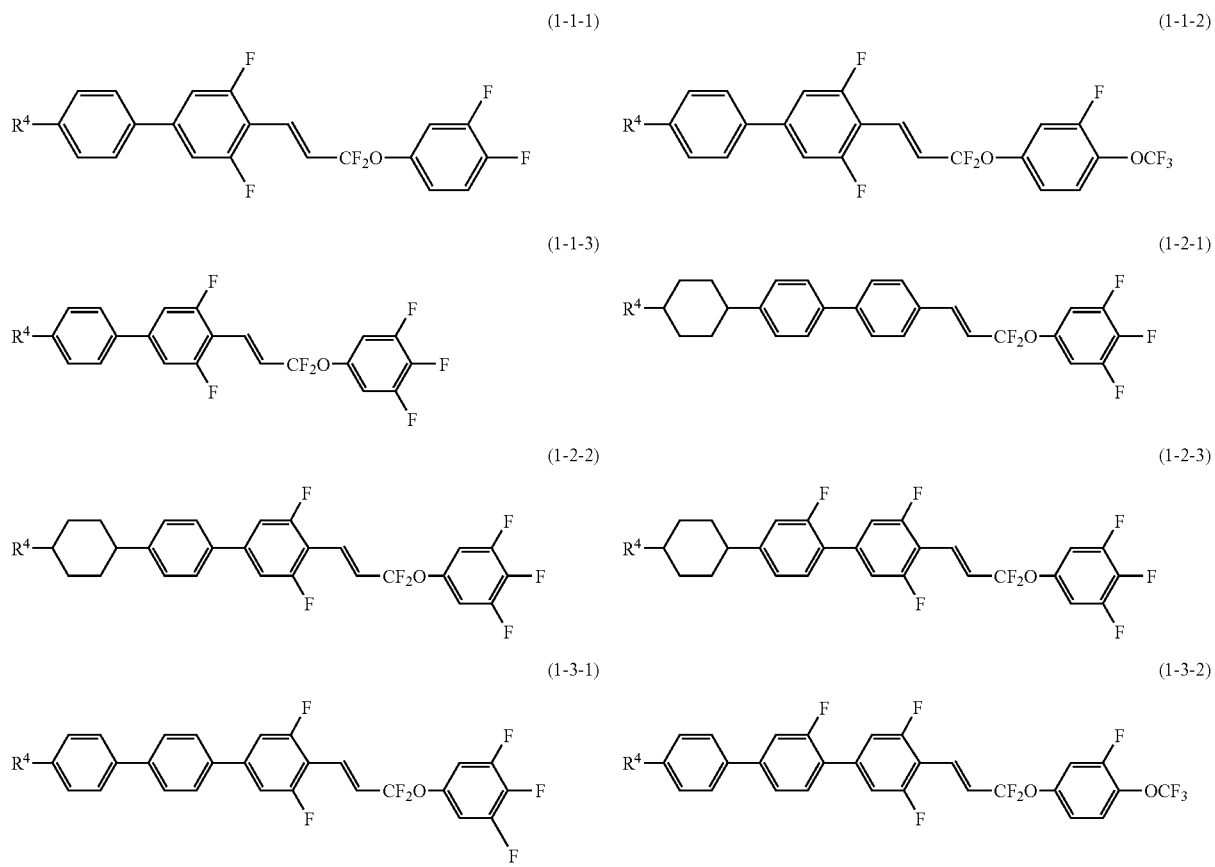

-continued
(1-3-3)
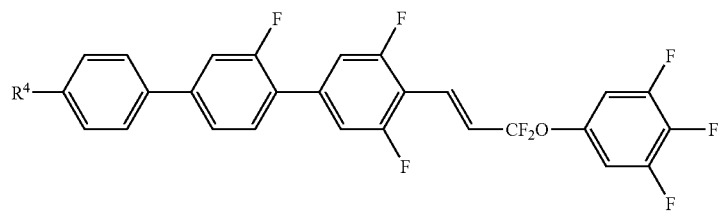
(1-4-1)
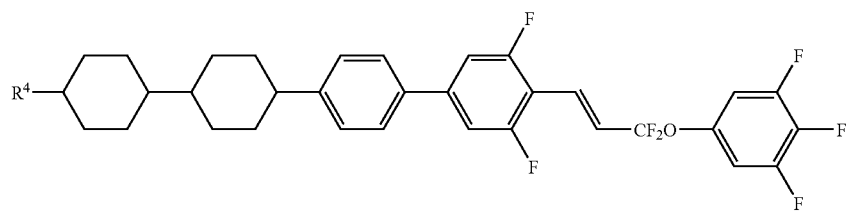
(1-4-2)
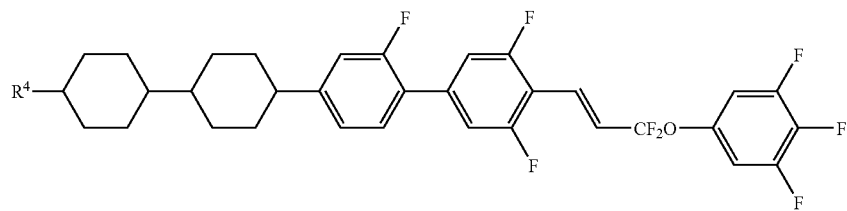
(1-5-1)
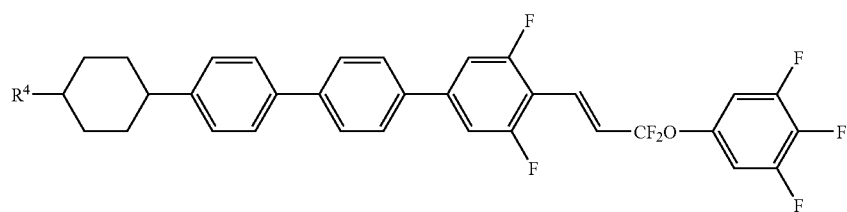
(1-5-2)
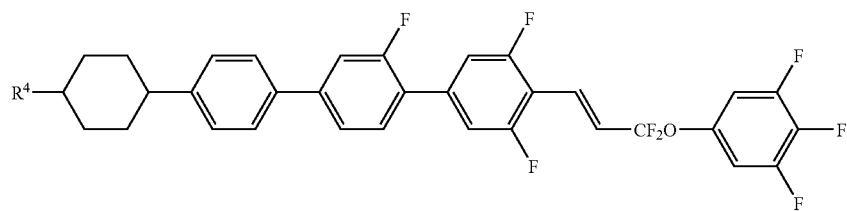
(1-5-3)
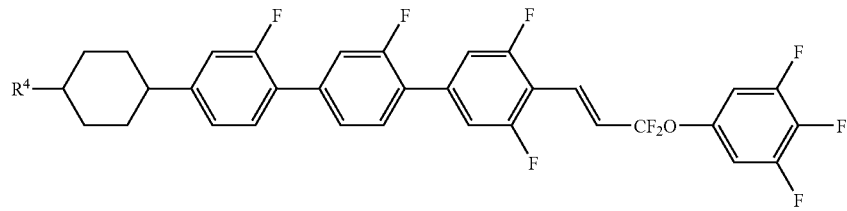
(1-6-1)
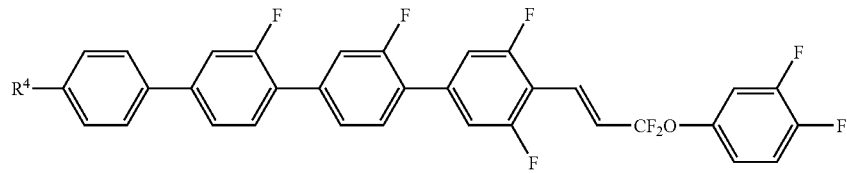

-continued
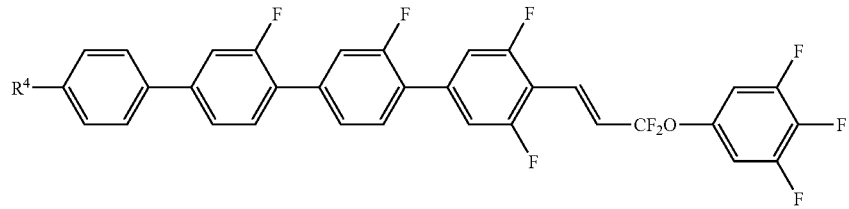
(1-6-2)
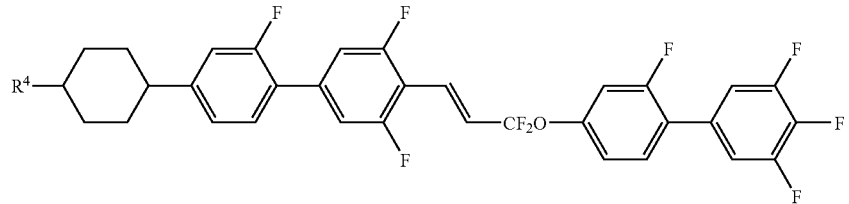
(1-7-1)
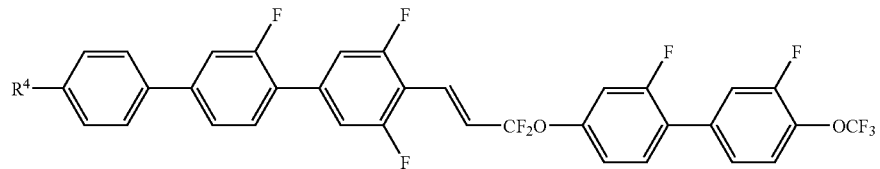
(1-8-1)
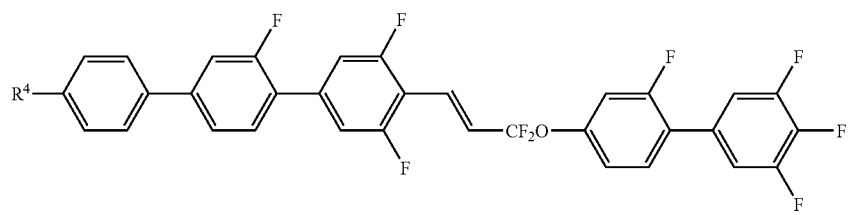
(1-8-2)
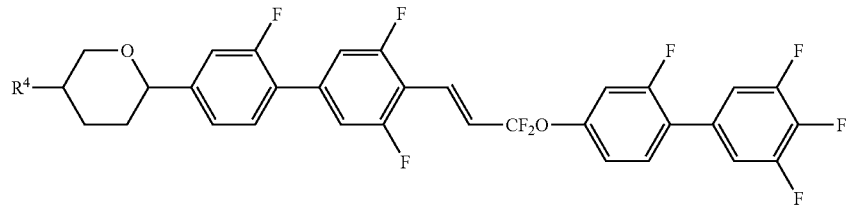
(1-9-1)
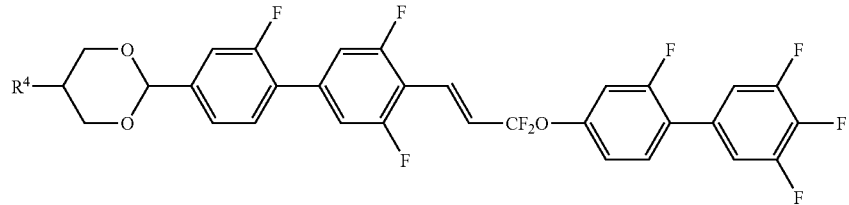
(1-10-1)
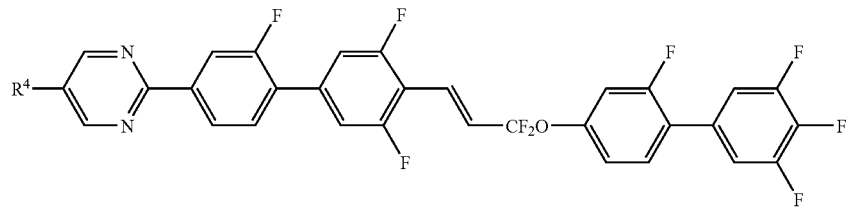
(1-11-1)
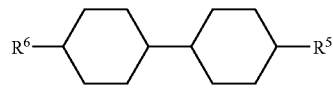
(2-1-1)
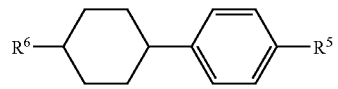
(2-2-1)

-continued
(2-3-1) 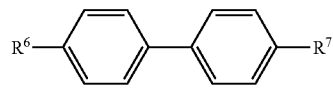
(2-4-1) 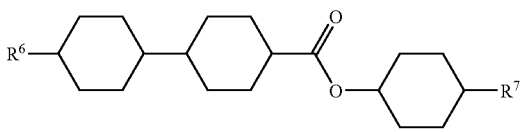
(2-5-1) 
(2-6-1) 
(2-7-1) 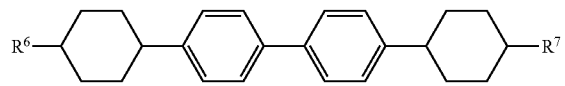
(2-8-1) 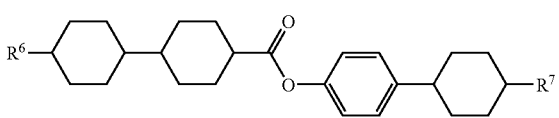
(2-9-1) 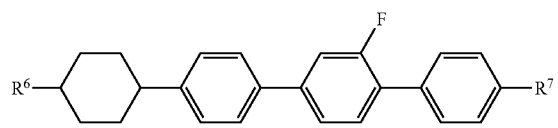
(2-10-1) 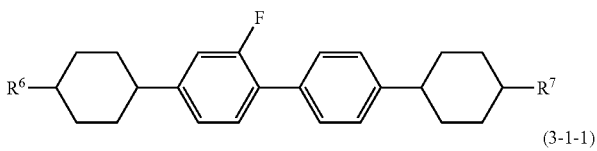
(2-11-1) 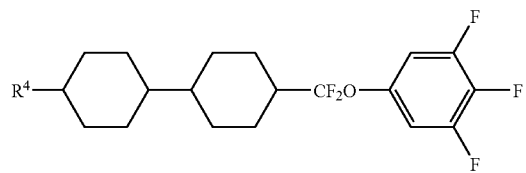
(3-1-1) 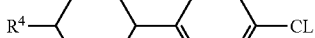
(3-2-1) 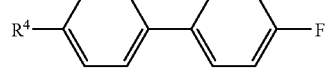
(3-3-1) 
(3-4-1) 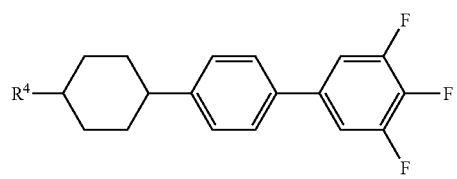
(3-5-1) 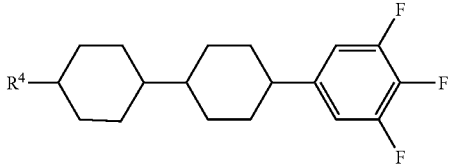
(3-6-1) 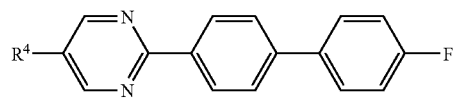
(3-7-1) 
(3-8-1) 
(3-9-1) 
(3-10-1) 
(3-11-1) 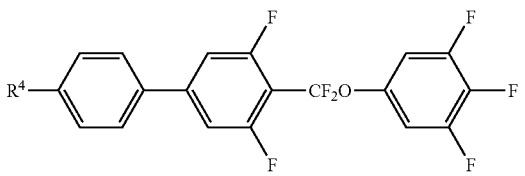

-continued (3-12-1)
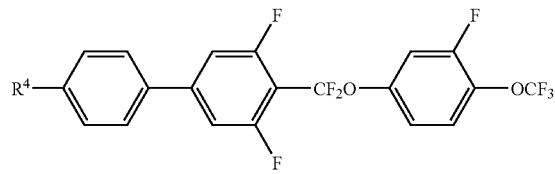

(3-13-1)
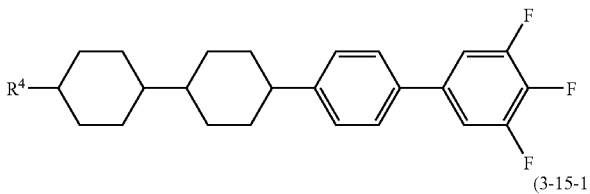

(3-14-1)
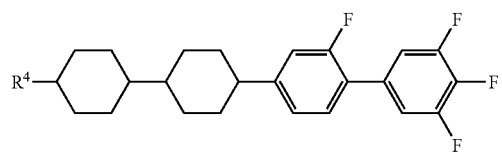

(3-15-1)
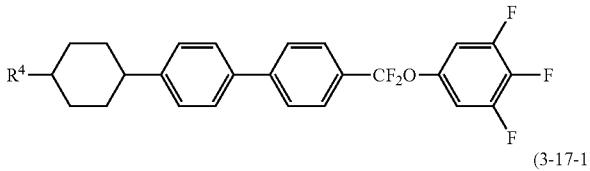

(3-16-1)
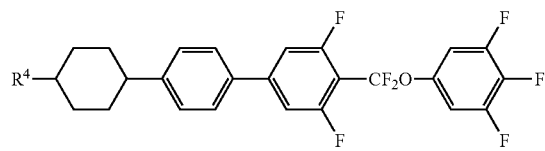

(3-17-1)
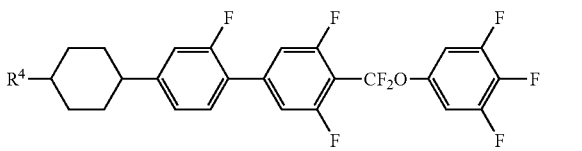

(3-18-1)
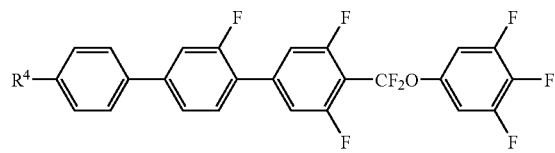

(3-19-1)
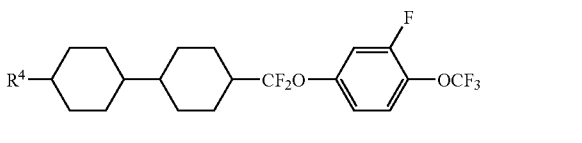

(3-20-1)
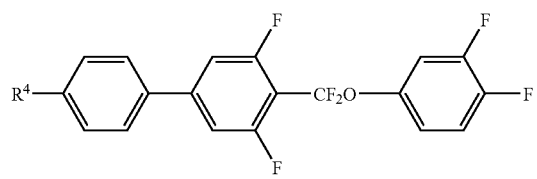

(3-21-1)
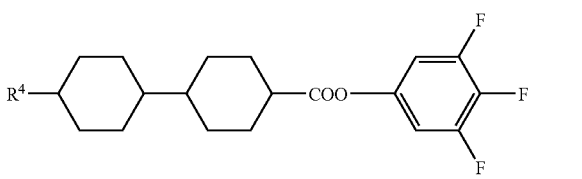

(3-22-1)
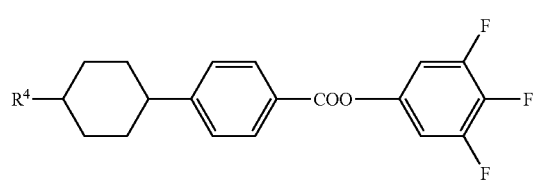

(3-23-1)
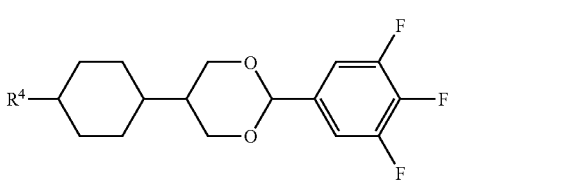

(3-24-1)
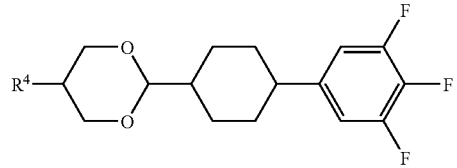

Sixth, additives capable of being mixed with the composition will be explained. The additives include an optically active compound, an antioxidant, an ultraviolet light absorbent, a coloring matter, a defoaming agent, a polymerizable compound, a polymerization initiator and so forth. An optically active compound is mixed in the composition for inducing the helical structure of liquid crystals to provide a twist angle. Examples of the optically active compound include the compounds (4-1) to (4-4) below. A desirable ratio of the optically active compound is approximately 5% by weight or less. A more desirable ratio is in the range from approximately 0.01% to approximately 2% by weight.

(4-1)
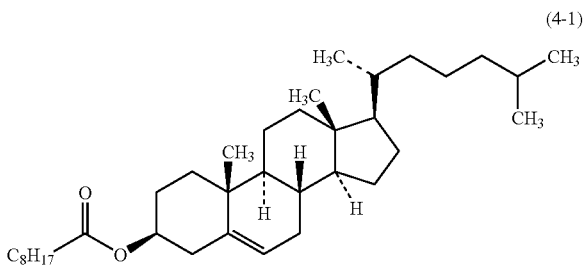

-continued

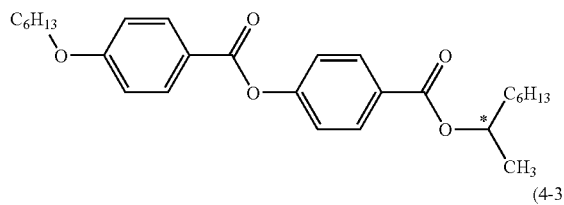
(4-2)

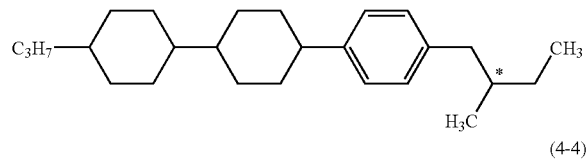
(4-3)

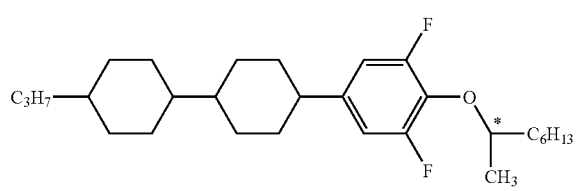
(4-4)

An antioxidant is mixed with the composition in order to avoid a decrease in specific resistance caused by heating in the air, or to maintain a large voltage holding ratio at room temperature and also at a high temperature close to the maximum temperature of the nematic phase even after the device has been used for a long time.

Preferred examples of the antioxidant include the compound (5):

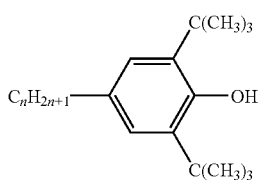
(5)

wherein n is an integer of from 1 to 9. In the compound (5), desirable n are 1, 3, 5, 7, or 9. More desirable n is 1 or 7. When n is 1, the compound (5) has a large volatility, and is effective in preventing the decrease of specific resistance caused by heating in the air. When n is 7, the compound (5) has a small volatility, and is effective in maintaining a large voltage holding ratio at room temperature and also at a high temperature close to the maximum temperature of the nematic phase even after the device has been used for a long time. A desirable ratio of the antioxidant is approximately 50 ppm or more for obtaining the advantage thereof, and is approximately 600 ppm or less for preventing the maximum temperature from being decreased and preventing the minimum temperature from being increased. A more desirable ratio thereof is in the range from approximately 100 ppm to approximately 300 ppm.

Preferred examples of the ultraviolet light absorbent include a benzophenone derivative, a benzoate derivative and a triazole derivative. A light stabilizer such as amine with steric hindrance is also desirable. A desirable ratio of the absorbent or stabilizer is approximately 50 ppm or more for obtaining the advantage thereof, and is approximately 10,000 ppm or less for preventing the maximum temperature from being decreased and preventing the minimum temperature from being increased. A more desirable ratio thereof is in the range from approximately 100 ppm to approximately 10,000 ppm.

A dichroic dye such as an azo dye or an anthraquinone dye is mixed with the composition to suit for a device of a guest host (GH) mode. A desirable ratio of the dye is in the range from approximately 0.01% to approximately 10% by weight. A defoaming agent such as dimethyl silicone oil or methylphenyl silicone oil is added to the composition to prevent foaming. A desirable ratio of the defoaming agent is approximately 1 ppm or more for obtaining the advantage thereof, and is approximately 1,000 ppm or less for preventing defective indication. A more desirable ratio thereof is in the range from approximately 1 ppm to approximately 500 ppm.

A polymerizable compound is mixed with the composition to suit for a device of a polymer sustained alignment (PSA) mode. Preferred examples of the polymerizable compound include a compound having a polymerizable group, such as acrylate, methacrylate, vinyl compounds, vinyloxy compounds, propenyl ether, epoxy compounds (oxirane, oxetane), and vinyl ketone. An especially desirable example is a derivative of acrylate or methacrylate. A desirable ratio of the polymerizable compound is approximately 0.05% by weight or more for obtaining the advantage thereof, and is approximately 10% by weight or less for preventing defective displaying. A more desirable ratio thereof is in the range from approximately 0.1% to approximately 2% by weight. The polymerizable compound is desirably polymerized by UV irradiation and so forth in the presence of a suitable initiator such as a photo-polymerization initiator. Suitable conditions for the polymerization, a suitable type of initiators and suitable amounts are known to those skilled in the art, and are described in the literature. For example, Irgacure 651 (registered trademark), Irgacure 184 (registered trademark) or Darocure 1173 (registered trademark) (Ciba Japan K.K.) that are photo-polymerization initiators are suitable for radical polymerization. The polymerizable compound desirably contains a photo-polymerization initiator in the range of approximately 0.1% to approximately 5% by weight. The polymerizable compound contains especially desirably a photopolymerization initiator in the range of approximately 1% to approximately 3% by weight.

Seventh, the methods for preparing the component compounds will be explained. These compounds can be prepared by known methods. The methods for the preparation will be exemplified below. The compounds (1-1-3) is prepared by the method disclosed in JP 2002-53513 A. The compounds (2-1-1) and (2-5-1) are prepared by the method disclosed in JP H4-30382 B (1992). The compounds (3-5-1) and (3-8-1) are prepared by the method disclosed in JP H2-233626 A/1990. The compounds (3-11-1) and (3-18-1) are prepared by the method disclosed in JP H10-251186 A (1998). Antioxidants are commercially available. The compound of formula (5) wherein n is 1 is commercially available from Sigma-Aldrich Corporation. The compound (5) wherein n is 7 is prepared according to the method described in U.S. Pat. No. 3,660,505 (1972).

The compounds for which preparation methods were not described above can be prepared according to the methods described in ORGANIC SYNTHESES (John Wiley & Sons, Inc), ORGANIC REACTIONS (John Wiley & Sons, Inc), COMPREHENSIVE ORGANIC SYNTHESIS (Pergamon Press), NEW EXPERIMENTAL CHEMISTRY COURSE (Shin Jikken Kagaku Kouza) (Maruzen, Inc.), and so forth. The composition is prepared according to known methods using the compounds thus obtained. For example, the component compounds are mixed and dissolved in each other by heating.

Last, use of the composition will be explained. The compositions of the invention mainly have a minimum temperature of approximately −10° C. or less, a maximum temperature of approximately 70° C. or more, and an optical anisotropy in the range of approximately 0.07 to approximately 0.20. The device containing the composition has a large voltage holding ratio. The composition is suitable for an AM device. The composition is suitable especially for an AM device of a transmission type. The composition having an optical anisotropy in the range of approximately 0.08 to approximately 0.25 and further the composition having an optical anisotropy in the range of approximately 0.10 to approximately 0.30 may be prepared by controlling the ratios of the component compounds or by mixing with other liquid crystal compounds. The composition can be used as a composition having a nematic phase and as an optically active composition by adding an optically active compound.

The composition can be used for an AM device. It can also be used for a PM device. The composition can also be used for an AM device and a PM device having a mode such as PC, TN, STN, ECB, OCB, IPS, VA, and PSA. It is especially desirable to use the composition for an AM device having a mode of TN, OCB or IPS. These devices may be of a reflection type, a transmission type or a semi-transmission type. It is desirable to use the composition for a device of a transmission type.

It can also be used for an amorphous silicon-TFT device or a polycrystal silicon-TFT device. The composition is also usable for a nematic curvilinear aligned phase (NCAP) device prepared by microcapsulating the composition, and for a polymer dispersed (PD) device in which a three-dimensional net-work polymer is formed in the composition.

It will be apparent to those skilled in the art that various modifications and variations can be made in the invention and specific examples provided herein without departing from the spirit or scope of the invention. Thus, it is intended that the invention covers the modifications and variations of this invention that come within the scope of any claims and their equivalents.

The following examples are for illustrative purposes only and are not intended, nor should they be interpreted to, limit the scope of the invention.

EXAMPLES

The composition and the compound are a subject for measurement in order to evaluate characteristics of the composition and the compound to be included in the composition. When the subject for measurement was a composition, the composition itself was measured as a sample, and the obtained value is described here. When the subject for measurement was a compound, a sample for measurement was prepared by mixing 15% by weight of the compound and 85% by weight of mother liquid crystals. A value of characteristic of the compound was calculated by extrapolating from a value obtained by measurement. That is: extrapolated value= (value measured−0.85×value for mother liquid crystals)/0.15. When a smectic phase (or crystals) separated out at this ratio at 25° C., a ratio of the compound to mother liquid crystals was changed step by step in the order of (10% by weight/90% by weight), (5% by weight/95% by weight) and (1% by weight/99% by weight), respectively. Values for a maximum temperature, optical anisotropy, viscosity, and dielectric anisotropy of the compound were obtained by the extrapolation.

The component of the mother liquid crystals is as shown below. The ratio of the component is expressed by weight %.

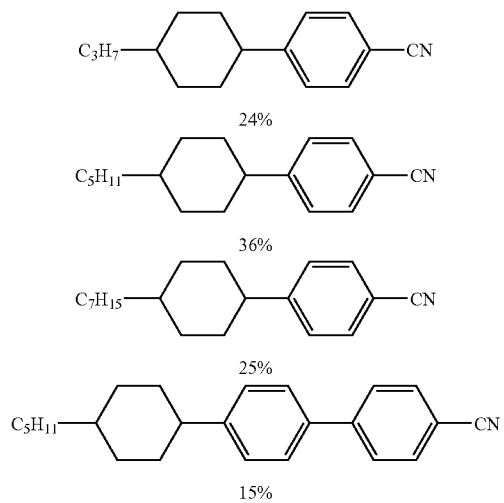

Measurement of the characteristics was carried out according to the following methods. Most methods are described in the Standard of Electronic Industries Association of Japan, EIAJ.ED-2521A or those with some modifications.

Maximum Temperature of a Nematic Phase (NI; ° C.): A sample was placed on a hot plate in a melting point apparatus equipped with a polarizing microscope and was heated at the rate of 1° C. per minute. A temperature was measured when part of the sample began to change from a nematic phase into an isotropic liquid. A higher limit of a temperature range of a nematic phase may be abbreviated to "a maximum temperature."

Minimum Temperature of a Nematic Phase (Tc; ° C.): A sample having a nematic phase was put in a glass vial and then kept in a freezer at temperatures of 0° C., −10° C., −20° C., −30° C., and −40° C. for ten days, respectively, and a liquid crystal phase was observed. For example, when the sample remained in a nematic phase at −20° C. and changed to crystals or a smectic phase at −30° C., Tc was expressed as ≦−20° C. A lower limit of a temperature range of a nematic phase may be abbreviated to "a minimum temperature."

Viscosity (Bulk viscosity; η; measured at 20° C.; mPa·s) Viscosity was measured by means of an E-type viscometer.

Viscosity (Rotational Viscosity; γ1; measured at 25° C.; mPa·s) Rotation viscosity was measured according to the method disclosed in M. Imai, et al., *Molecular Crystals and Liquid Crystals*, Vol. 259, p. 37 (1995). A sample was placed in a TN device, in which a twist angle was 0°, and the cell gap between two glass plates was 5 μm. The TN device was impressed with a voltage in the range of from 16 V to 19.5 V stepwise by 0.5 V. After a period of 0.2 second with no impress of voltage, voltage impress was repeated with only one rectangular wave (rectangular pulse of 0.2 second) and application of no voltage (2 seconds). A peak current and a peak time of a transient current generated by the voltage impress were measured. The rotation viscosity was obtained from the measured values and the calculating equation (8) in the article presented by M. Imai, et al., p. 40. As for the dielectric anisotropy necessary for the calculation, the value measured by the measuring method of dielectric anisotropy described below with the device for measuring the rotation viscosity was used.

Optical Anisotropy (Δn; measured at 25° C.): Measurement was carried out with an Abbe refractometer mounting a polarizing plate on an ocular using light at a wavelength of 589 nm. The surface of a main prism was rubbed in one direction, and then a sample was dropped on the main prism. A refractive index (n∥) was measured when the direction of polarized light was parallel to that of the rubbing. A refractive index (n⊥) was measured when the direction of polarized light was perpendicular to that of the rubbing. A value of optical anisotropy was calculated from the equation: Δn=n∥−n⊥.

Dielectric Anisotropy (Δ∈; measured at 25° C.): A sample having a nematic phase was put in a TN device having a distance between two glass plates (cell gap) of 9 μm and a twist angle of 80°. Sine waves (10 V, 1 kHz) were impressed onto the device, and a dielectric constant (∈∥) in a major axis direction of a liquid crystal molecule was measured after 2 seconds. Sine waves (0.5 V, 1 kHz) were impressed onto the device and a dielectric constant (∈⊥) in a minor axis direction of a liquid crystal molecule was measured after 2 seconds. A value of a dielectric anisotropy was calculated from the equation: Δ∈=∈∥−∈⊥.

Threshold Voltage (Vth; measured at 25° C.; V): Measurement was carried out with an LCD Evaluation System Model LCD-5100 made by Otsuka Electronics Co., Ltd. The light source was a halogen lamp. A sample was poured into a TN device of a normally white mode, in which the cell gap between two glass plates was approximately 0.45/Δn (μm), and a twist angle was 80°. Voltage to be impressed onto the device (32 Hz, rectangular waves) was stepwise increased by 0.02 volt starting from 0 V up to 10 V. During the stepwise increasing, the device was irradiated with light in a perpendicular direction, and the amount of light passing through the device was measured. A voltage-transmission curve was prepared, in which a maximum amount of light corresponded to 100% transmittance and a minimum amount of light corresponded to 0% transmittance. Threshold voltage was a value at 90% transmittance.

Voltage Holding Ratio (VHR-1; measured at 25° C.; %): A TN device used for measurement had a polyimide-alignment film and the cell gap between two glass plates was 5 μm. A sample was poured into the device, and then the device was sealed with an adhesive polymerizable by the irradiation of ultraviolet light. The TN device was impressed and charged with pulse voltage (60 microseconds at 5 V). Decreasing voltage was measured for 16.7 milliseconds with a High Speed Voltmeter and the area A between a voltage curve and a horizontal axis in a unit cycle was obtained. The area B was an area without decreasing. The voltage holding ratio is a percentage of the area A to the area B.

Voltage Holding Ratio (VHR-2; measured at 80° C.; %): A TN device used for measurement had a polyimide-alignment film and the cell gap between two glass plates was 5 μm. A sample was poured into the device, and then the device was sealed with an adhesive polymerizable by the irradiation of ultraviolet light. The TN device was impressed and charged with pulse voltage (60 microseconds at 5 V). Decreasing voltage was measured for 16.7 milliseconds with a High Speed Voltmeter and the area A between a voltage curve and a horizontal axis in a unit cycle was, obtained. The area B was an area without decreasing. The voltage holding ratio is a percentage of the area A to the area B.

Voltage Holding Ratio (VHR-3; measured at 25° C.; %): A voltage holding ratio was measured after irradiating with ultraviolet light to evaluate stability to ultraviolet light. A composition having a large VHR-3 has a large stability to ultraviolet light. A TN device used for measurement had a polyimide-alignment film and the cell gap was 5 μm. A sample was poured into the device, and then the device was irradiated with light for 20 minutes. The light source was a super-high pressure mercury lamp USH-500D (made by Ushio, Inc.), and the distance between the device and the light source was 20 cm. In measurement of VHR-3, decreasing voltage was measured for 16.7 milliseconds. The VHR-3 is desirably 90% or more, and more desirably 95% or more.

Voltage Holding Ratio (VHR-4; measured at 25° C.; %): A voltage holding ratio was measured after heating a TN device having a sample poured therein in a constant-temperature chamber at 80° C. for 500 hours to evaluate stability to heat. A composition having a large VHR-4 has a large stability to heat. In measurement of VHR-4, decreasing voltage was measured for 16.7 milliseconds.

Response Time (τ; measured at 25° C.; millisecond): Measurement was carried out with an LCD Evaluation System Model LCD-5100 made by Otsuka Electronics Co., Ltd. The light source was a halogen lamp. The low-pass filter was set at 5 kHz. A sample was poured into a TN device of a normally white mode, in which the cell gap between two glass plates was 5.0 μm, and a twist angle was 80°. Rectangular waves (60 Hz, 5 V, 0.5 second) were impressed to the device. During impressing, the device was irradiated with light in a perpendicular direction, and the amount of light passing through the device was measured. A maximum amount of light corresponds to 100% transmittance, and a minimum amount of light corresponds to 0% transmittance. Rise time (τr; millisecond) is the time required for a change in transmittance from 90% to 10%. Fall time (τf; millisecond) is the time required for a change in transmittance from 10% to 90%. Response time is the sum of the rise time and the fall time thus obtained.

Specific Resistance (ρ; measured at 25° C.; Ωcm): A sample of 1.0 ml was poured into a vessel equipped with electrodes. The vessel was impressed with DC voltage (10 V) and a direct current was measured after 10 seconds. Specific resistance was calculated from the following equation: Specific resistance=(voltage×electric capacitance of vessel)/(direct current×dielectric constant in a vacuum).

Gas Chromatographic Analysis: A Gas Chromatograph Model GC-14B made by Shimadzu Corporation was used for measurement. The carrier gas was helium (2 ml per minute). An evaporator and a detector (FID) were set up at 280° C. and 300° C., respectively. A capillary column DB-1 (length 30 m, bore 0.32 mm, film thickness 0.25 μm; dimethylpolysiloxane as stationary phase, no polarity) made by Agilent Technologies, Inc. was used for the separation of the component compound. After the column had been kept at 200° C. for 2 minutes, it was further heated to 280° C. at the rate of 5° C. per minute. A sample was prepared in an acetone solution (0.1% by weight), and 1 μl of the solution was injected into the evaporator. A recorder used was a Chromatopac Model C-R5A made by Shimadzu Corporation or its equivalent. A gas chromatogram obtained showed the retention time of a peak and a peak area corresponding to the component compound.

Solvents for diluting the sample may also be chloroform, hexane, and so forth. The following capillary column may also be used: HP-1 made by Agilent Technologies, Inc. (length 30 m, bore 0.32 Rau, film thickness 0.25 μm), Rtx-1 made by Restek Corporation (length 30 m, bore 0.32 mm, film thickness 0.25 μm), and BP-1 made by SGE International Pty. Ltd. (length 30 m, bore 0.32 mm, film thickness 0.25 μm). In order to prevent compound peaks from overlapping, a capillary column CBP1-M50-025 (length 50 m, bore 0.25 mm, film thickness 0.25 μm) made by Shimadzu Corporation may be used.

The ratio of liquid crystal compounds contained in the composition may be calculated by the following method. The liquid crystal compounds can be detected with a gas chromatograph. The area ratio of each peak in the gas chromatogram corresponds to the ratio (number of moles) of liquid crystal compounds. When the above capillary columns are used, the correction coefficient of each liquid crystal compound may be regarded as 1. Therefore, the ratio of liquid crystal compounds (% by weight) is calculated from the area ratio of each peak.

The invention will be explained in detail by way of Examples. The invention is not limited by the Examples described below. The compounds described in Comparative Examples and the Examples are expressed by the symbols according to the definition in Table 3. In Table 3, the configuration of 1,4-cyclohexylene is trans. The parenthesized numbers next to the symbolized compounds in the Examples correspond to the numbers of the desirable compounds. The symbol (–) means other liquid crystal compound. The ratios (percentage) of liquid crystal compounds are expressed by percentage by weight (% by weight) based on the total weight of liquid crystal compositions, and the liquid crystal compositions contain impurities in addition to the liquid crystal compounds. Last, the characteristics of the compositions are summarized.

TABLE 3

Method for Description of Compounds Using Symbols
R—(Ai)—Zi . . . Zn—(An)—X

| | Symbol |
|---|---|
| 1) Left terminal R— | |
| $C_nH_{2n+1}$— | n— |
| $C_nH_{2n+1}O$— | nO— |
| $C_mH_{2m+1}OC_nH_{2n}$— | mOn— |
| $CH_2=CH$— | V— |
| $C_nH_{2n+1}$—CH=CH— | nV— |
| $CH_2=CH$—$C_nH_{2n}$— | Vn— |
| $C_mH_{2m+1}$—CH=CH—$C_nH_{2n}$— | mVn— |
| $CF_2=CH$— | VFF— |
| $CF_2=CH$—$C_nH_{2n}$— | VFFn— |
| 2) Ring Structure—An— | |
| —$C_nH_{2n+1}$ | —n |
| —$OC_nH_{2n+1}$ | —On |
| —CH=$CH_2$ | —V |
| —CH=CH—$C_nH_{2n+1}$ | —Vn |
| —$C_nH_{2n}$—CH=$CH_2$ | —nV |
| —CH=$CF_2$ | —VFF |
| —F | —F |
| —Cl | —CL |
| —$OCF_3$ | —OCF3 |
| —CN | —C |
| 3) Bonding group —Zn— | |
| —$C_2H_4$— | 2 |
| —COO— | E |
| —CH=CH— | V |
| —C≡C— | T |
| —$CF_2O$— | X |
| —CH=CH—$CF_2O$— | VX |

TABLE 3-continued

Method for Description of Compounds Using Symbols
R—(Ai)—Zi . . . Zn—(An)—X

| | Symbol |
|---|---|
| 4) Right terminal —X | |

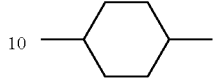
H

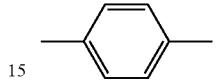
B

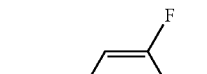
B(F)

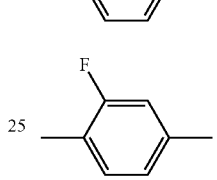
B(2F)

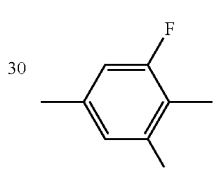
B(F,F)

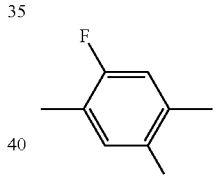
B(2F,5F)

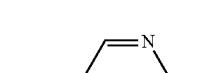
Py

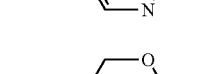
dh

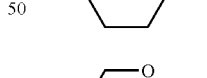
G

5) Examples of Description

Example 1 3-BB(F)B(F,F)—F

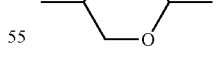

TABLE 3-continued

Method for Description of Compounds Using Symbols
R—(Ai)—Zi...Zn—(An)—X

| | Symbol |
|---|---|
| Example 2 | V—HH-3 |

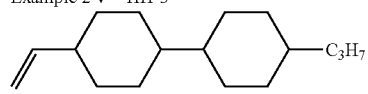

Example 3 3-HHB-1

Example 4 3-BB(F,F)XB(F)—OCF3

Comparative Example 1

Example 4 was selected from among compositions disclosed in WO 2002-53513 A. The basis for the selection was because the composition contained the compound (1-1-3). The composition had the following components and characteristics.

| | | |
|---|---|---|
| 3-BB(F,F)VXB(F,F)-F | (1-1-3) | 15% |
| 3-HB-C | (—) | 20.4% |
| 5-HB-C | (—) | 30.6% |
| 7-HB-C | (—) | 21.25% |
| 5-HBB-C | (—) | 12.75% |

NI=68.5° C.; Δn=0.144; Δ∈=14.6; η=29.2 mPa·s.

Example 1

| | | |
|---|---|---|
| 3-BB(F,F)VXB(F,F)-F | (1-1-3) | 16% |
| 5-BB(F)B(F,F)VXB(F)B(F,F)-F | (1-8-2) | 5% |
| V-HH-3 | (2-1-1) | 36% |
| 1V-HH-3 | (2-1-1) | 11% |
| V-HHB-1 | (2-5-1) | 11% |
| V2-HHB-1 | (2-5-1) | 3% |
| 2-BB(F)B-3 | (2-7-1) | 9% |
| 2-BB(F)B-5 | (2-7-1) | 3% |
| 3-HBB(F,F)-F | (3-4-1) | 6% |

NI=73.3° C.; Tc≦−20° C.; Δn=0.114; Δ∈=4.3; Vth=2.19 V; η=13.2 mPa·s; γ1=52.4 mPa·s; τ=9.2 ms; VHR-1=99.0%; VHR-2=98.0%.

Example 2

| | | |
|---|---|---|
| 3-BB(F,F)VXB(F,F)-F | (1-1-3) | 8% |
| 3-BB(F)B(F,F)VXB(F,F)-F | (1-3-3) | 4% |
| 5-BB(F)B(F,F)VXB(F,F)-F | (1-3-3) | 5% |
| V-HH-3 | (2-1-1) | 48% |
| 1V-HH-3 | (2-1-1) | 8% |
| 1-BB(F)B-2V | (2-7-1) | 7% |
| 2-BB(F)B-2V | (2-7-1) | 9% |
| 3-BB(F)B-2V | (2-7-1) | 11% |

NI=82.1° C.; Tc≦−20° C.; Δn=0.135; Δ∈=3.8; Vth=2.19 V; η=13.2 mPa·s; γ1=52.4 mPa·s; τ=9.2 ms; VHR-1=99.0%; VHR-2=97.8%.

Example 3

| | | |
|---|---|---|
| 3-BB(F,F)VXB(F)-F | (1-1-1) | 5% |
| 3-BB(F,F)VXB(F)-OCF3 | (1-1-2) | 6% |
| 5-BB(F)B(F,F)VXB(F)B(F,F)-F | (1-8-2) | 6% |
| 2-HH-3 | (2-1-1) | 20% |
| V-HH-3 | (2-1-1) | 28% |
| 3-HB-O2 | (2-2-1) | 4% |
| V2-BB-1 | (2-3-1) | 5% |
| V-HHB-1 | (2-5-1) | 8% |
| 1V-HBB-2 | (2-6-1) | 5% |
| 2-BB(F)B-3 | (2-7-1) | 4% |
| 5-HBB(F)B-2 | (2-11-1) | 6% |
| 3-HHB-CL | (3-4-1) | 3% |

NI=83.6° C.; Tc≦−20° C.; Δn=0.115; Δ∈=2.6; Vth=2.49 V; η=12.9 mPa·s; γ1=51.8 mPa·s; τ=9.2 ms; VHR-1=99.1%; VHR-2=98.2%.

Example 4

| | | |
|---|---|---|
| 5-HBBVXB(F,F)-F | (1-2-1) | 3% |
| 5-HBB(F,F)VXB(F,F)-F | (1-2-2) | 6% |
| 5-BBB(F,F)VXB(F,F)-F | (1-3-1) | 3% |
| 5-PyB(F)B(F,F)VXB(F)B(F,F)-F | (1-11-1) | 6% |
| V-HH-3 | (2-1-1) | 46% |
| V-HH-5 | (2-1-1) | 4% |
| 1V-HH-3 | (2-1-1) | 5% |
| 3-HH-O1 | (2-1-1) | 5% |
| 1V2-BB-1 | (2-3-1) | 4% |
| 3-HHEH-5 | (2-4-1) | 3% |
| VFF-HHB-1 | (2-5) | 3% |
| 3-HHB-O1 | (2-5-1) | 3% |
| 3-HB-CL | (3-1-1) | 9% |

NI=76.7° C.; Tc≦−20° C.; Δn=0.094; Δ∈=2.8; Vth=2.43 V; η=12.5 mPa·s; γ1=50.9 mPa·s; τ=9.1 ms; VHR-1=99.2%; VHR-2=98.2%.

Example 5

| | | |
|---|---|---|
| 3-BB(F,F)VXB(F,F)-F | (1-1-3) | 5% |
| 5-HBBB(F,F)VXB(F,F)-F | (1-5-1) | 3% |
| 5-HB(F)B(F)B(F,F)VXB(F,F)-F | (1-5-3) | 3% |
| 5-BB(F)B(F)B(F,F)VXB(F,F)-F | (1-6-2) | 3% |
| 5-HB(F)B(F,F)VXB(F)B(F,F)-F | (1-7-1) | 5% |
| V-HH-3 | (2-1-1) | 49% |
| V-HH-5 | (2-1-1) | 3% |
| 7-HB-1 | (2-2-1) | 4% |
| V2-BB-1 | (2-3-1) | 6% |
| V-HHB-1 | (2-5-1) | 8% |
| 3-HBB-2 | (2-6-1) | 3% |
| 1V2-BB-F | (3-2) | 5% |
| 1V2-BB-CL | (3-3) | 3% |

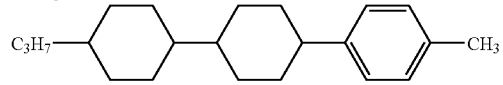

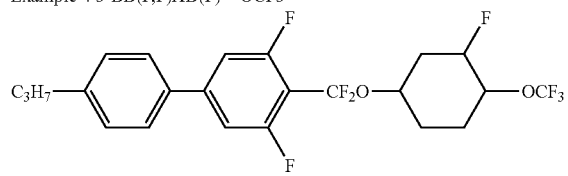

NI=76.0° C.; Tc≦−20° C.; Δn=0.108; Δ∈=2.8; Vth=2.43 V; η=12.0 mPa·s; γ1=50.6 mPa·s; τ=9.1 ms; VHR-1=99.2%; VHR-2=98.1%.

Example 6

| | | |
|---|---|---|
| 3-BB(F,F)VXB(F,F)-F | (1-1-3) | 7% |
| V-HH-3 | (2-1-1) | 45% |
| 1V-HH-3 | (2-1-1) | 9% |
| V2-BB-1 | (2-3-1) | 6% |
| V2-BB(F)B-1 | (2-7-1) | 5% |
| 3-HHEBH-3 | (2-8-1) | 3% |
| 5-HBBH-3 | (2-9-1) | 3% |
| 5-HB(F)BH-3 | (2-10-1) | 3% |
| 3-HHXB(F,F)-F | (3-6-1) | 7% |
| 3-BB(F,F)XB(F,F)-F | (3-11-1) | 5% |
| 4-BB(F)B(F,F)XB(F,F)-F | (3-18-1) | 7% |

NI=75.0° C.; Tc≦−20° C.; Δn=0.098; Δ∈=3.5; Vth=2.33 V; η=13.3 mPa·s; γ1=52.4 mPa·s; τ=9.2 ms; VHR-1=99.0%; VHR-2=98.0%.

Example 7

| | | |
|---|---|---|
| 3-BB(F,F)VXB(F,F)-F | (1-1-3) | 7% |
| 5-HB(F)B(F,F)VXB(F,F)-F | (1-2-3) | 3% |
| 5-BB(F)B(F,F)VXB(F)-OCF3 | (1-3-2) | 3% |
| 5-HHBB(F,F)VXB(F,F)-F | (1-4-1) | 3% |
| 5-HHB(F)B(F,F)VXB(F,F)-F | (1-4-2) | 3% |
| V-HH-3 | (2-1-1) | 50% |
| 1V-HH-3 | (2-1-1) | 8% |
| V-HHB-1 | (2-5-1) | 10% |
| 3-HB-CL | (3-1-1) | 4% |
| 3-PyBB-F | (3-10-1) | 3% |
| 4-PyBB-F | (3-10-1) | 3% |
| 5-PyBB-F | (3-10-1) | 3% |

NI=85.1° C.; Tc≦−20° C.; Δn=0.103; Δ∈=2.7; Vth=2.48 V; η=13.5 mPa·s; γ1=53.1 mPa·s; τ=9.2 ms; VHR-1=98.9%; VHR-2=97.9%.

Example 8

| | | |
|---|---|---|
| 3-BB(F,F)VXB(F,F)-F | (1-1-3) | 4% |
| 5-HBB(F)B(F,F)VXB(F,F)-F | (1-5-2) | 3% |
| 5-BB(F)B(F)B(F,F)VXB(F)-F | (1-6-1) | 3% |
| V-HH-3 | (2-1-1) | 47% |
| 1V-HH-3 | (2-1-1) | 10% |
| V2-BB-1 | (2-3-1) | 5% |
| 3-HHB-1 | (2-5-1) | 3% |
| V-HHB-1 | (2-5-1) | 5% |
| 1-BB(F)B-2V | (2-7-1) | 6% |
| 3-BB(F,F)XB(F)-OCF3 | (3-12-1) | 4% |
| 4-BB(F)B(F,F)XB(F,F)-F | (3-18-1) | 6% |
| 3-HGB(F,F)-F | (3-23-1) | 4% |

NI=76.7° C.; Tc≦−20° C.; Δn=0.105; Δ∈=2.8; Vth=2.43 V; η=13.5 mPa·s; γ1=52.5 mPa·s; τ=9.1 ms; VHR-1=99.1%; VHR-2=98.0%.

Example 9

| | | |
|---|---|---|
| 3-BB(F,F)VXB(F,F)-F | (1-1-3) | 5% |
| 3-BB(F)B(F,F)VXB(F,F)-F | (1-3-3) | 8% |
| 5-BB(F)B(F,F)VXB(F)B(F)-OCF3 | (1-8-1) | 5% |
| 3-HH-VFF | (2-1) | 4% |
| V-HH-3 | (2-1-1) | 48% |
| 1V-HH-3 | (2-1-1) | 7% |
| 1-BB(F)B-2V | (2-7-1) | 7% |
| 2-BB(F)B-2V | (2-7-1) | 9% |
| 3-HHB(F,F)-F | (3-5-1) | 3% |
| 3-HBB-F | (3-7-1) | 4% |

NI=83.1° C.; Tc≦−20° C.; Δn=0.123; Δ∈=4.1; Vth=2.24 V; η=11.9 mPa·s; γ1=50.1 mPa·s; τ=9.0 ms; VHR-1=99.2%; VHR-2=98.0%.

Example 10

| | | |
|---|---|---|
| 3-BB(F,F)VXB(F,F)-F | (1-1-3) | 5% |
| 5-dhB(F)B(F,F)VXB(F)B(F,F)-F | (1-9-1) | 5% |
| V-HH-3 | (2-1-1) | 48% |
| 1V-HH-3 | (2-1-1) | 7% |
| V2-BB-1 | (2-3-1) | 4% |
| 1-BB(F)B-2V | (2-7-1) | 5% |
| 2-BB(F)B-2V | (2-7-1) | 8% |
| 2-BB(F)B-2V | (2-7-1) | 5% |
| 5-HBBXB(F,F)-F | (3-15-1) | 3% |
| 5-HBB(F,F)XB(F,F)-F | (3-16-1) | 3% |
| 5-HB(F)B(F,F)XB(F,F)-F | (3-17-1) | 3% |
| 3-BB(F,F)XB(F)-F | (3-20-1) | 4% |

NI=76.4° C.; Tc≦−20° C.; Δn=0.120; Δ∈=3.9; Vth=2.30 V; η=12.7 mPa·s; γ1=51.1 mPa·s; τ=9.0 ms; VHR-1=99.2%; VHR-2=98.0%.

Example 11

| | | |
|---|---|---|
| 3-BB(F,F)VXB(F,F)-F | (1-1-3) | 5% |
| 5-GB(F)B(F,F)VXB(F)B(F,F)-F | (1-10-1) | 4% |
| V-HH-3 | (2-1-1) | 49% |
| 1V-HH-3 | (2-1-1) | 7% |
| V2-BB-1 | (2-3-1) | 4% |
| 1-BB(F)B-2V | (2-7-1) | 7% |
| 2-BB(F)B-2V | (2-7-1) | 9% |
| 3-BB(F)B(F,F)-F | (3-9-1) | 6% |
| 3-HHBB(F,F)-F | (3-13-1) | 3% |
| 5-GHB(F,F)-F | (3-24-1) | 3% |
| 1O1-HBBH-5 | (—) | 3% |

NI=78.5° C.; Tc≦−20° C.; Δn=0.116; Δ∈=3.0; Vth=2.36 V; η=12.9 mPa·s; γ1=51.2 mPa·s; τ=9.0 ms; VHR-1=98.9%; VHR-2=98.0%.

Example 12

| 3-BB(F)B(F,F)VXB(F,F)-F | (1-3-3) | 4% |
| --- | --- | --- |
| 5-BB(F)B(F,F)VXB(F,F)-F | (1-3-3) | 5% |
| V-HH-3 | (2-1-1) | 48% |
| 1V-HH-3 | (2-1-1) | 7% |
| V2-BB-1 | (2-3-1) | 4% |
| 1-BB(F)B-2V | (2-7-1) | 5% |
| 2-BB(F)B-2V | (2-7-1) | 8% |
| 2-BB(F)B-2V | (2-7-1) | 5% |
| 3-HHB(F)B(F,F)-F | (3-14-1) | 3% |
| 3-HHXB(F)-OCF3 | (3-19-1) | 4% |
| 3-HHEB(F,F)-F | (3-21-1) | 4% |
| 3-HBEB(F,F)-F | (3-22-1) | 3% |

NI=81.0° C.; Tc≦−20° C.; Δn=0.120; Δ∈=3.9; Vth=2.30 V; η=11.8 mPa·s; γ1=49.9 mPa·s; τ=9.0 ms; VHR-1=99.0%; VHR-2=97.9%.

Although the invention has been described and illustrated with a certain degree of particularity, it is understood that the disclosure has been made only by way of example, and that numerous changes in the conditions and order of steps can be resorted to by those skilled in the art without departing from the spirit and scope of the invention.

The compositions of Examples 1 to 12 have smaller viscosity than those of Comparative example 1. Thus the liquid crystal composition of the invention has superior characteristics to those of the liquid crystal composition disclosed in Patent Document 1.

The liquid crystal composition satisfies at least one characteristic among the characteristics such as a high maximum temperature of a nematic phase, a low minimum temperature of a nematic phase, a small viscosity, a large optical anisotropy, a large dielectric anisotropy, a large specific resistance, a high stability to ultraviolet light, and a high stability to heat, or is properly balanced regarding at least two characteristics. The liquid crystal display device that contains the composition provides an AM device that has a short response time, a large voltage holding ratio, a large contrast ratio, a long service life and so forth, and therefore can be used for a liquid crystal projector, a liquid crystal television and so forth.

What is claimed is:

1. A liquid crystal composition having a nematic phase that includes two components, wherein the first component is at least one compound selected from the group of compounds represented by formulas (1), and the second component is at least one compound selected from the group of compounds represented by formula (2):

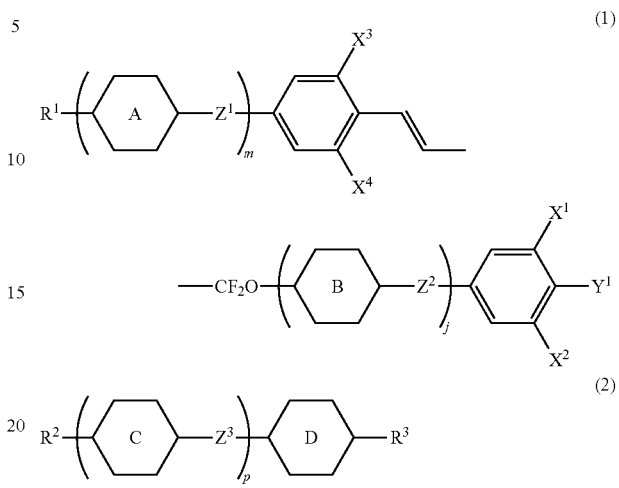

wherein $R^1$, $R^2$ and $R^3$ are independently alkyl having 1 to 12 carbons, alkoxy having 1 to 12 carbons or alkenyl having 2 to 12 carbons or alkenyl having 2 to 12 carbons in which arbitrary hydrogen is replaced by fluorine; ring A is independently tetrahydropyran-2,5-diyl, 1,4-cyclohexylene, 1,3-dioxane-2,5-diyl, 1,4-phenylene, 2-fluoro-1,4-phenylene, 3-fluoro-1,4-phenylene, 3,5-difluoro-1,4-phenylene or 2,5-pyrimidine; ring B is independently 1,4-cyclohexylene, 1,3-dioxane-2,5-diyl, 1,4-phenylene, 2-fluoro-1,4-phenylene, 3-fluoro-1,4-phenylene, 3,5-difluoro-1,4-phenylene or 2,5-pyrimidine; ring C and ring D are each independently 1,4-cyclohexylene, 1,4-phenylene, 2-fluoro-1,4-phenylene, 3-fluoro-1,4-phenylene, or 2,5-difluoro-1,4-phenylene; $Z^1$ and $Z^2$ are each independently a single bond, ethylene, carbonyloxy or difluoromethyleneoxy; $Z^3$ is independently a single bond, ethylene or carbonyloxy; $X^1$, $X^2$, $X^3$ and $X^4$ are each independently hydrogen or fluorine; $Y^1$ is fluorine, chlorine or trifluoromethoxy; and p is 1, 2 or 3; m and j are each independently 0, 1, 2 or 3, and the sum of m and j is 3 or less.

2. The liquid crystal composition according to claim 1, wherein the first component is at least one compound selected from the group of compounds represented by formulas (1-1) to (1-11)

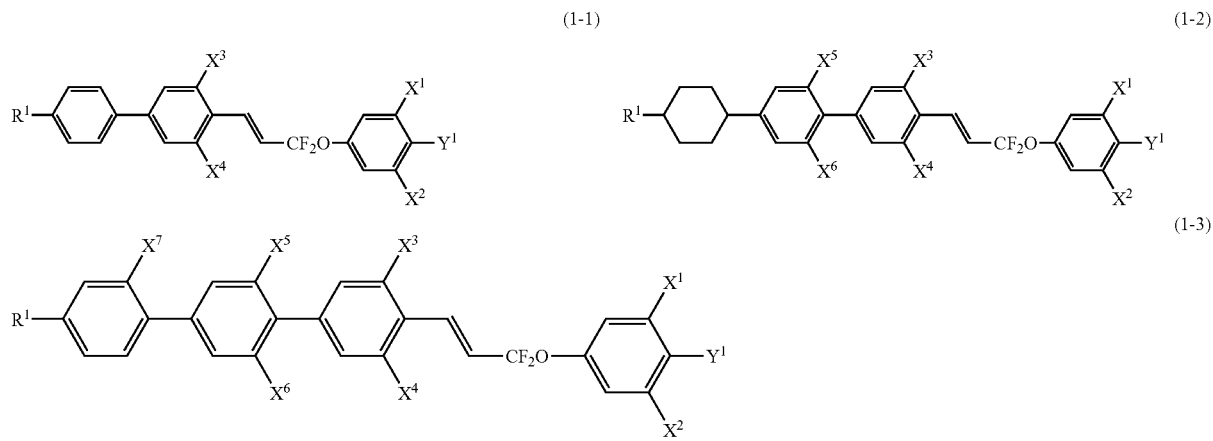

(1-4)
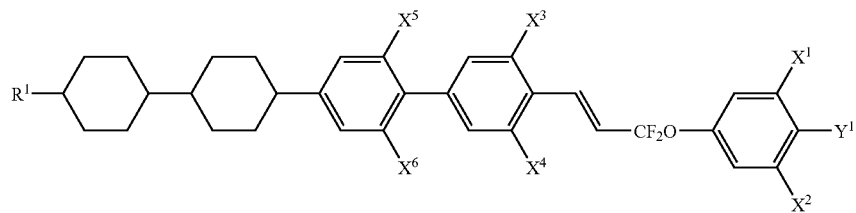
(1-5)
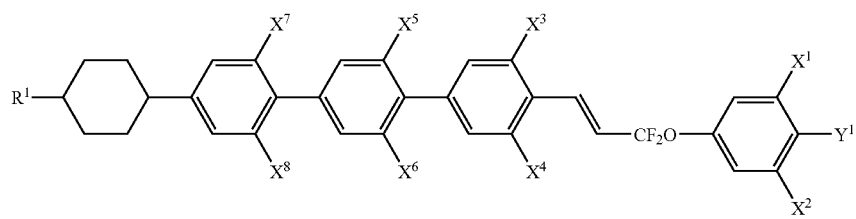
(1-6)
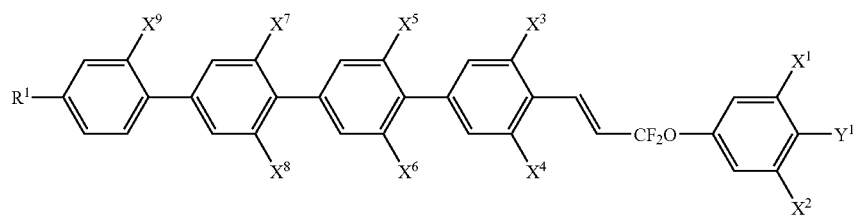
(1-7)
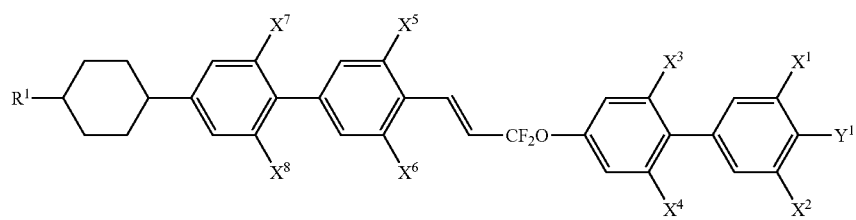
(1-8)
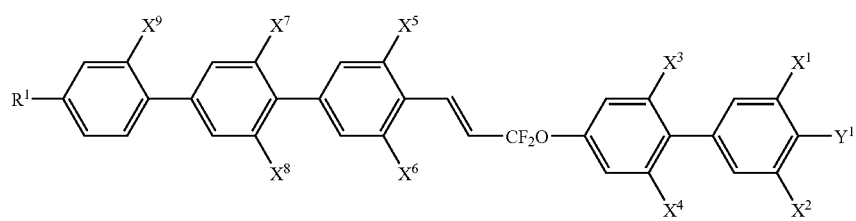
(1-9)
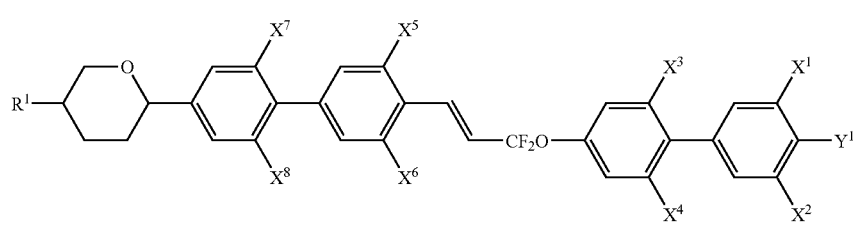
(1-10)
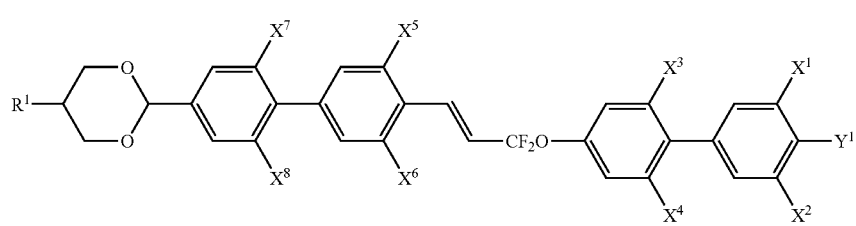

-continued (1-11)

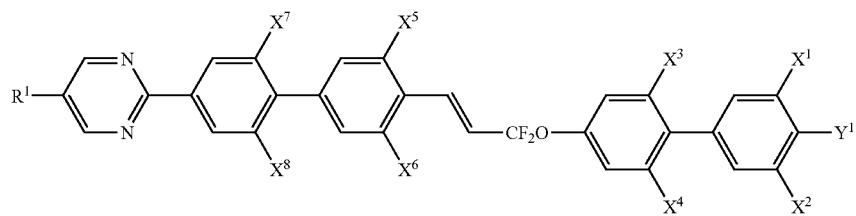

wherein $R^1$ is alkyl having 1 to 12 carbons, alkoxy having 1 to 12 carbons or alkenyl having 2 to 12 carbons or alkenyl having 2 to 12 carbons in which arbitrary hydrogen is replaced by fluorine; $X^1$, $X^2$, $X^3$, $X^4$, $X^5$, $X^6$, $X^7$, $X^8$ and $X^9$ are each independently hydrogen or fluorine; and $Y^1$ is fluorine, chlorine or trifluoromethoxy.

3. The liquid crystal composition according to claim 2, wherein the first component is at least one compound selected from the group of compounds represented by formulas (1-3).

4. The liquid crystal composition according to claim 1, wherein the second component is at least one compound selected from the group of compounds represented by formulas (2-1) to (2-11)

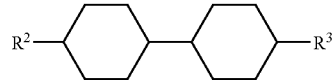
(2-1)

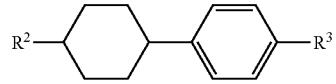
(2-2)

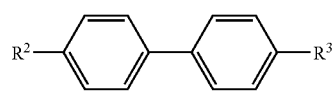
(2-3)

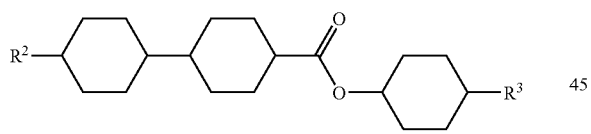
(2-4)

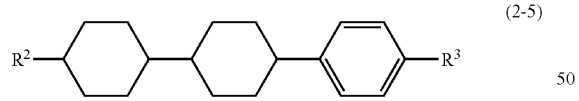
(2-5)

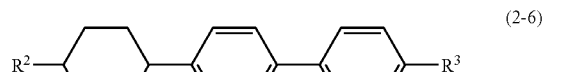
(2-6)

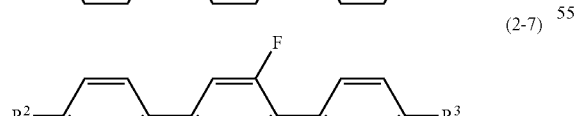
(2-7)

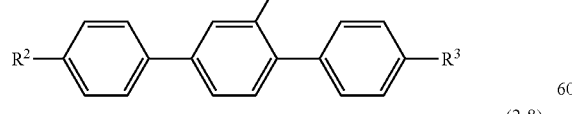
(2-8)

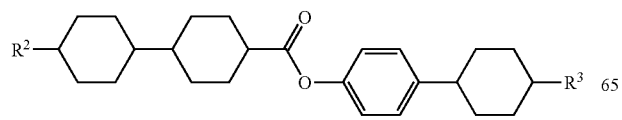

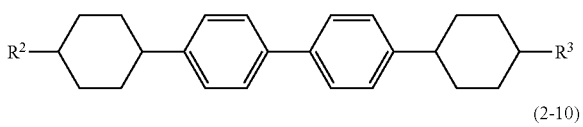
(2-9)

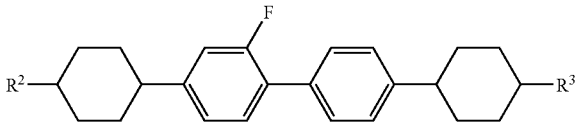
(2-10)

(2-11)

wherein $R^2$ and $R^3$ are each independently alkyl having 1 to 12 carbons, alkoxy having 1 to 12 carbons, alkenyl having 2 to 12 carbons, or alkenyl having 2 to 12 carbons in which arbitrary hydrogen is replaced by fluorine.

5. The liquid crystal composition according to claim 2, wherein the second component is at least one compound selected from the group of compounds represented by formulas (2-1) to (2-11)

(2-1)

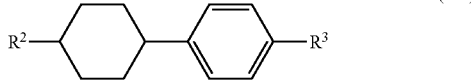
(2-2)

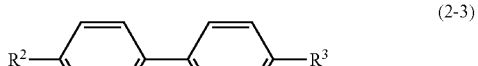
(2-3)

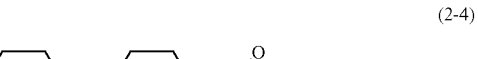
(2-4)

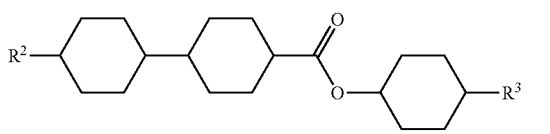
(2-5)

-continued

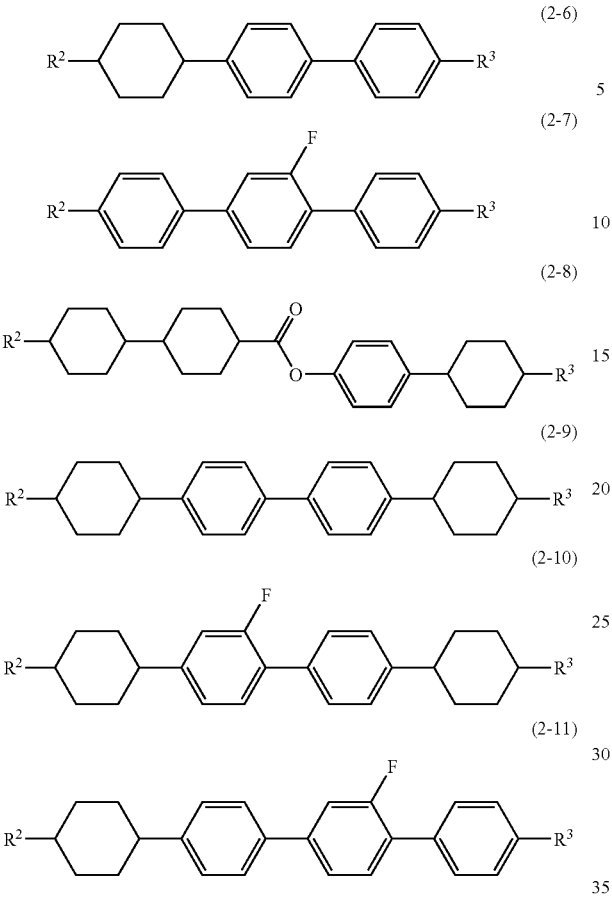

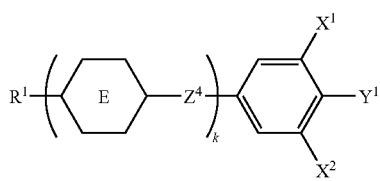

wherein R² and R³ are each independently alkyl having 1 to 12 carbons, alkoxy having 1 to 12 carbons, alkenyl having 2 to 12 carbons, or alkenyl having 2 to 12 carbons in which arbitrary hydrogen is replaced by fluorine.

6. The liquid crystal composition according to claim 4, wherein the second component is at least one compound selected from the group of compounds represented by formula (2-1).

7. The liquid crystal composition according to claim 5, wherein the second component is at least one compound selected from the group of compounds represented by formula (2-1).

8. The liquid crystal composition according to claim 1, wherein the ratio of the first component is in the range of approximately 5% to approximately 40% by weight, and the ratio of the second component is in the range of approximately 35% to approximately 95% by weight, based on the total weight of the liquid crystal composition.

9. The liquid crystal composition according to claim 2, wherein the ratio of the first component is in the range of approximately 5% to approximately 40% by weight, and the ratio of the second component is in the range of approximately 35% to approximately 95% by weight, based on the total weight of the liquid crystal composition.

10. The liquid crystal composition according to claim 1, wherein the composition further includes at least one compound selected from the group of compounds represented by formula (3) as the third component wherein $R^1$ is alkyl having 1 to 12 carbons, alkoxy having 1 to 12 carbons or alkenyl having 2 to 12 carbons; or alkenyl having 2 to 12 carbons in which arbitrary hydrogen is replaced by fluorine ring E is independently 1,4-cyclohexylene, 1,3-dioxane-2,5-diyl, 1,4-phenylene, 2-fluoro-1,4-phenylene, 3-fluoro-1,4-phenylene, 3,5-difluoro-1,4-phenylene, or 2,5-pyrimidine; $Z^4$ is independently a single bond, ethylene, carbonyloxy, or difluoromethyleneoxy; $X^1$ and $X^2$ are each independently hydrogen or fluorine; $Y^1$ is fluorine, chlorine, or trifluoromethoxy; and k is 1, 2 or 3.

11. The liquid crystal composition according to claim 10, wherein the third component is at least one compound selected from the group of compounds represented by formulas (3-1) to (3-24)

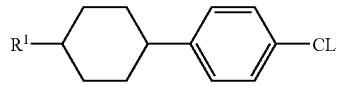

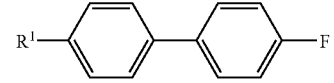

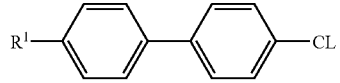

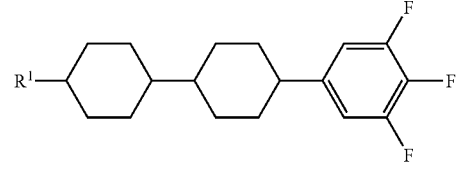

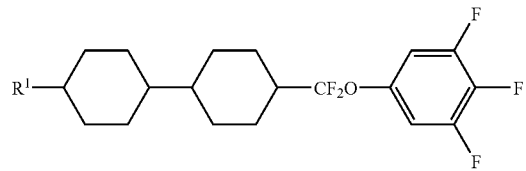

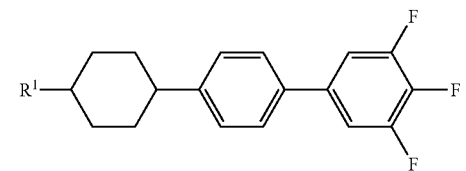 (3-8)
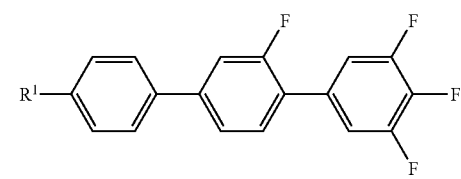 (3-9)
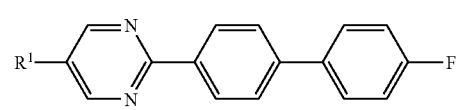 (3-10)
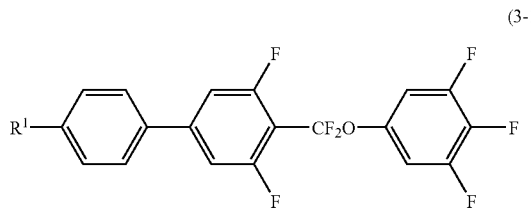 (3-11)
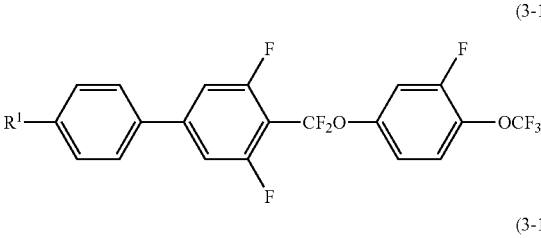 (3-12)
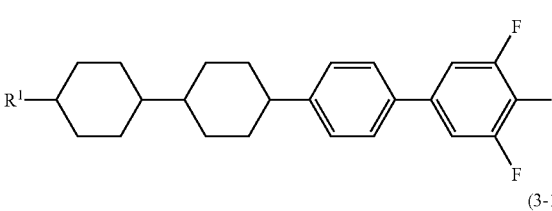 (3-13)
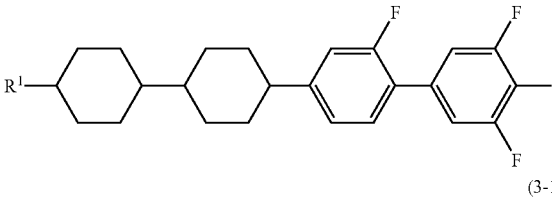 (3-14)
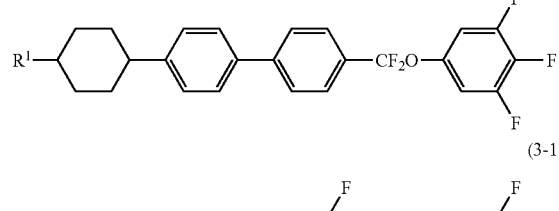 (3-15)
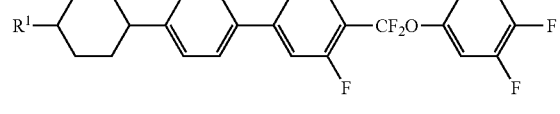 (3-16)
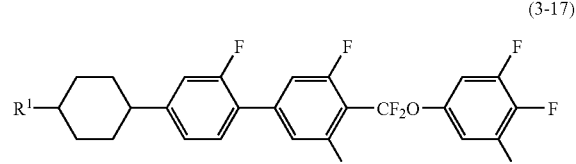 (3-17)
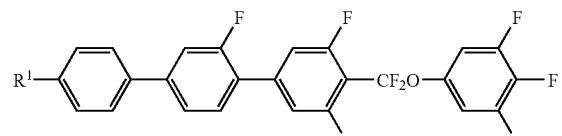 (3-18)
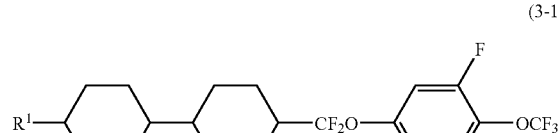 (3-19)
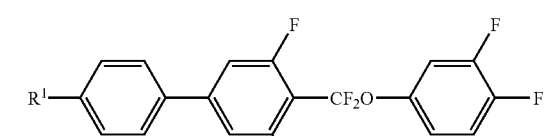 (3-20)
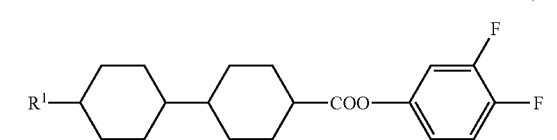 (3-21)
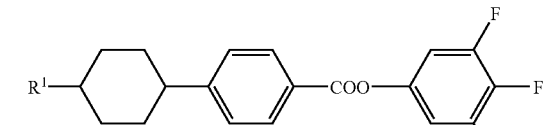 (3-22)
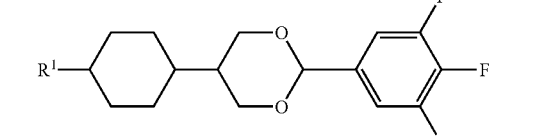 (3-23)
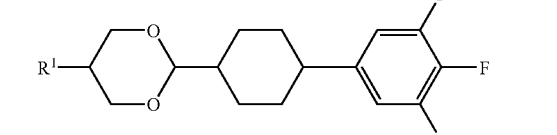 (3-24)
wherein $R^1$ is alkyl having 1 to 12 carbons, alkoxy having 1 to 12 carbons or alkenyl having 2 to 12 carbons, or alkenyl having 2 to 12 carbons in which arbitrary hydrogen is replaced by fluorine.

12. The liquid crystal composition according to claim 10, wherein the ratio of the third component is in the range of approximately 3% to approximately 35% by weight based on the total weight of the liquid crystal composition.

13. The liquid crystal composition according to claim 1, wherein the composition has a maximum temperature of a nematic phase of approximately 70° C. or more, an optical anisotropy (25° C.) at a wavelength of 589 nm of approximately 0.08 or more, and a dielectric anisotropy (25° C.) at a frequency of 1 kHz of approximately 2 or more.

14. The liquid crystal display device according to claim 1 that includes the liquid crystal composition.

15. The liquid crystal display device according to claim 14, wherein the operation mode of the liquid crystal display device is a twisted nematic (TN) mode, an optically compensated bend (OCB) mode, an in-plane switching (IPS) mode, or a polymer sustained alignment (PSA) mode, and the driving mode of the liquid crystal display device is an active matrix mode.

* * * * *